(12) United States Patent
Koyama et al.

(10) Patent No.: US 6,216,556 B1
(45) Date of Patent: *Apr. 17, 2001

(54) STEERING WHEEL

(75) Inventors: Tooru Koyama; Tadashi Yamamoto, both of Aichi-ken; Mikine Hayashi, Gifu-ken; Atsushi Nagata, Inazawa, all of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/447,415

(22) Filed: Nov. 23, 1999

Related U.S. Application Data

(63) Continuation of application No. 09/176,951, filed on Oct. 22, 1998, now Pat. No. 6,065,366.

(30) Foreign Application Priority Data

Oct. 22, 1997 (JP) .................................................... 9-289651
Jul. 17, 1998 (JP) .................................................. 10-203949

(51) Int. Cl.[7] .............................. B62D 1/04; B62D 1/06; G05G 1/04
(52) U.S. Cl. ........................... 74/552; 74/558; 74/558.5; 428/317.1; 428/327; 156/293; 264/494
(58) Field of Search ......................... 74/552, 558, 558.5; 174/136; 150/52 M, 52 R; 403/344; 138/162, 166, 168, 167, 163; 273/75 R, 73 J; 264/275, 279, 318, 494; 280/731, 728.2; 428/317.1, 327; 156/293

(56) References Cited

U.S. PATENT DOCUMENTS

| | | | |
|---|---|---|---|
| 0,917,695 | 5/2000 | Koyama et al. . | |
| 3,714,844 | 2/1973 | Tsuda | 74/552 |
| 3,726,152 | * 4/1973 | Tsuneizumi | 74/552 |
| 4,353,266 | * 10/1982 | Grothe | 74/552 |
| 4,579,775 | 4/1986 | Ohta et al. | 428/317.1 |
| 4,581,954 | * 4/1986 | Uchida | 74/558 X |
| 4,598,002 | 7/1986 | Kimura | 428/36 |
| 4,640,150 | 2/1987 | Kobayashi et al. | 74/552 |
| 4,758,470 | 7/1988 | Koyama | 428/327 |
| 4,800,775 | * 1/1989 | Iuchi | 74/552 |
| 4,893,521 | * 1/1990 | Ishida et al. | 74/558.5 X |
| 5,070,742 | 12/1991 | Sakane et al. | 74/552 |
| 5,305,655 | 4/1994 | Kaga | 74/552 |
| 5,792,302 | 8/1998 | Nakada et al. | 156/293 |
| 5,833,916 | 11/1998 | Nakada et al. | 264/494 |
| 5,879,611 | * 3/1999 | Takahashi et al. | 264/275 |
| 5,899,118 | * 5/1999 | Satoh et al. | 74/552 |
| 5,901,615 | * 5/1999 | Itoh et al. | 74/552 |
| 6,042,143 | * 3/2000 | Luo et al. | 289/731 |

FOREIGN PATENT DOCUMENTS

| | | | |
|---|---|---|---|
| 2151239 | * 7/1985 | (GB) | 74/552 |
| 3542105 A1 | * 7/1985 | (DE) | 74/552 |
| 57-178970 | 11/1982 | (JP) | 74/552 |
| 60-32843 | 2/1985 | (JP) | 74/552 |
| 60-94484 | 5/1985 | (JP) | 74/552 |
| 60-219158 | 11/1985 | (JP) | 74/552 |
| 6-278614 | 10/1994 | (JP) | 74/552 |
| 8-310407 | 11/1996 | (JP) | 74/552 |

* cited by examiner

Primary Examiner—Vinh T. Luong
(74) Attorney, Agent, or Firm—Pillsbury Winthrop LLP

(57) ABSTRACT

This steering wheel includes a ring portion to be gripped during steering, a core having at least one ridge, and a core coating layer coating the core. The core coating layer has a relatively hard portion formed of a first synthetic resin and a relatively soft portion formed of a second synthetic resin arranged in the circumferential direction relative to each other. The relatively hard portion is harder than the relatively soft portion. The ridge is positioned along the core so as to be covered by the relatively hard portion.

15 Claims, 17 Drawing Sheets

STEERING WHEEL

This is a continuation of Application Ser. No. 09/176,951 filed Oct. 22, 1998, now U.S. Pat. No. 6,065,366.

BACKGROUND OF THE INVENTION

1. Field of the Invention

The present invention relates to a steering wheel to be used when a vehicle is steered, and a process for manufacturing the steering wheel.

2. Description of Related Art

In a steering wheel of the prior art, a smooth decorative layer is formed on the surface of a ring portion to be gripped at steering time (as disclosed in Unexamined Published Japanese Patent Application No. 8-310407).

Moreover, this steering wheel having the decorative layer is molded by the following process. First, a steering wheel core is set in a mold. Also, a skin for the decorative layer is set while leaving a clearance around the steering wheel core. A coating layer is then poured into the clearance between the core and the skin to mold the steering wheel.

In short, the portion including the skin for the decorative layer is integrally prepared.

The ring portion is a three-dimensional portion having a curved face. In order to match the curved face of the outer circumference of the ring portion, the decorative layer has had to be prepared accordingly. This has caused considerable inconvenience for steering wheel manufacturers.

Here, in order to eliminate this inconvenience in the manufacture of the steering wheel, it is conceivable to attach the decorative layer by means of an adhesive to the surface of the molding coating layer. It is, however, necessary to so adhere the decorative layer such that no level difference occurs on the outer circumference of the coating layer that has a section in the axial direction of the steering wheel. This necessity stems from the need to prevent degradation in the touch and feeling of the decorative layer.

When the decorative layer can be adhered without causing a level difference, however, the working of the terminals of the decorative layer is troublesome.

SUMMARY OF THE INVENTION

With a view to solving the above-specified problems, an object of the invention is to provide a steering wheel for which a smooth decorative layer can be formed easily on the surface of a ring portion, and a process for manufacturing the steering wheel.

In order to achieve this object, according to the invention, there is provided a steering wheel comprising a ring portion to be gripped at steering time. The ring portion includes: a core, a core coating layer (also referred to herein as a coating layer) for coating the core and a decorative layer to be arranged on the surface of the coating layer. The decorative layer has a printed layer and a protective coating layer. The printed layer is formed by hydraulic transfer, and is arranged to cover the surface of the coating layer. The protective coating layer is transparent, and is arranged to cover the surface of the printed layer so as to protect the printed layer.

The printed layer formed by the hydraulic transfer is formed such that, even if its printed surface is curved, it has a small and uniform thickness. This makes it possible to form a smooth decorative layer easily on the surface of the ring portion. The printed layer is naturally covered with the protective coating layer to promote durability. As a result, the printed layer does not peel off, even when the ring portion is gripped and steered. This also prevents the appearance of the ring portion from being degraded.

In the steering wheel according to the invention, therefore, a smooth and durable decorative layer can be easily formed on the surface of the ring portion.

Moreover, the decorative layer is desirably arranged at a portion of the ring portion apart from the spoke portions.

In this case, the printed layer need not be formed during hydraulic transfer in the vicinity of the spoke portions, which are largely curved three-dimensionally on the coating layer surface of the ring portion. This makes it possible to prevent runs in the pattern of the printed layer. As a result, the decorative layer can have a printed layer with a beautiful pattern.

The coating layer may be made of a synthetic resin having a hardness (JIS A) of 40 to 90, or no less than 95.

A steering wheel having a coating layer made of a synthetic resin having a hardness (JIS A) of 40 to 90 can provide a soft feeling when the ring portion is gripped.

On the other hand, a steering wheel having a coating layer made of a synthetic resin having a hardness (JIS A) no less than 95 can provide a firm grip feeling. In the steering wheel thus constructed, the ring portion can be gripped without any sense of strangeness, even when the printed layer is colored with a grain pattern or a metallic tone.

The decorative layer is arranged at a portion of the surface of the coating layer, and a skin is arranged at the remainder of the surface of the coating layer. A level difference portion for folding therein the end portions of the skin is arranged at the remainder of the surface of the coating layer. In this steering wheel, its design effects are improved by a skin. In the present steering wheel, moreover, the end portions of the skin can be easily folded within the level difference portion after the molding step.

And, in this steering wheel, slits extending in the circumferential direction of the ring portion section are desirably arranged at the portion where the coating layer is covered with the skin.

In this steering wheel, a molding shrinkage occurs at the time of molding the coating layer. Then, an internal stress is established to shrink the coating layer in the circumferential direction of the plane of the ring portion. In this steering wheel, however, the slits extending in the circumferential direction of the section of the ring portion are arranged at the portion where the coating layer is covered with the skin.

As a result, the portion of the slits extending along the circumferential direction of the section of the coating layer is deformed in order to extend the slits. In other words, the stress is not concentrated only at the portion where there is a level difference. This makes it possible to suppress cracking or deformation of the level difference portion, which might otherwise cause defective products.

Any cracks or deformations at the portion of the slits are covered with the skin. The result is that the ring portion has a deteriorated appearance.

Thus, the steering wheel having such slits as described above results in improving yield ratio, while also suppressing the occurrence of defects at the time of molding the coating layer.

Moreover, the steering wheel having the slits extending in the circumferential direction of the section of the ring portion can achieve the following actions and effects. Even if the ring portion core is coated therearound with the coating layer made of the hard synthetic resin, more specifically, the rigidity of the ring portion can be lowered. Therefore, when the ring portion, is impacted, the ring portion can be smoothly deformed. As a result, the steering wheel can effectively absorb the energy of the impact.

The coating layer is desirably arranged such that the sectional area of the coating layer at the portion where the slits are arranged is smaller than that of the coating layer at the level difference portion.

In this steering wheel, concentrated stress at the time of molding shrinkage acts without fail on the slits portion. As a result, this steering wheel enables a suppression of cracking or deformation at the level difference portion, which might otherwise cause defects.

Moreover, in this steering wheel, the coating layer at the portion arranged a decorative layer is made of a hard synthetic resin substantially. Also, the coating layer at the portion arranged a skin is made of a soft synthetic resin substantially.

In this steering wheel, the portion of the decorative layer and the portion of the skin have a different feeling when touched. As a result, the steering wheel enables an improved grip feeling when gripped.

Still moreover, the portion made of a hard synthetic resin is arranged at a portion apart from the spoke portions. Also, the portion made of a soft synthetic resin is arranged at a portion of the spoke portions.

In this steering wheel, the printed layer of the decorative layer is not influenced by the curved shape of the coating layer of the spoke portions. In the steering wheel, therefore, it is possible to form printed layer with a decorative pattern.

Moreover, in the steering wheel which the decorative layer is made of one kind of synthetic resin materials, a cushion layer is provided between a skin and a coating layer. In this steering wheel, an improved feeling is enabled by cushion layer when the portion of the skin is gripped.

The coating layer has first and second coating layers in the circumferential direction of the plane of the ring portion. Moreover, the first and second coating layers have differing hardnesses. The first coating layer has the decorative layer arranged on its surface. The second coating layer has a skin arranged on its surface. The ring portion core is shaped to have a U-shaped section. This steering wheel is desired to have the following construction. Specifically, the ring portion core has a closed portion at the end face in the first coating layer so as to close a groove on the inner peripheral side of the U-shaped section.

In this steering wheel, as for the mold faces of the mold for the coating layer, in the boundary portion between the first and second coating layers, the mold faces may be pushed onto only the outer circumference of the ring portion core, including the outer periphery of the closed portion. In short, the mold faces need not be pushed to contact with the inner peripheral side of the U-shaped section of the ring portion core. At the time of molding the first coating layer, therefore, it is possible to suppress any burring which might otherwise extend along the ring portion core toward the second coating layer.

In this steering wheel, therefore, the first coating layer for covering the ring portion core can be formed with a high sizing accuracy level. In this steering wheel, troublesome post-treatment such as the deburring step can be reduced after the molding of the first coating layer.

In this case, moreover, the ring portion core coated with the first coating layer desirably has a ridge to be buried in the end portions of the first coating layer.

In this steering wheel, the molding shrinkage of the first coating layer can be suppressed at the time of molding by the hooking action of the ridge. As a result, in this steering wheel, the first coating layer for coating the ring portion core can be formed which a high sizing accuracy level.

According to the invention, there is provided a process for manufacturing a steering wheel in which a decorative layer including a printed layer and a transparent protective coating layer for protecting the printed layer is arranged on the surface of a coating layer for coating the core of a ring portion to be gripped at steering time. At a first manufacture step, the coating layer is molded around the ring portion core by means of a mold. Next, the printed layer is formed on the surface of the coating layer by hydraulic transfer. Moreover, the protective coating layer is formed by applying a coating agent to the surface of the printed layer, thereby to manufacture the steering wheel.

In this manufacturing, process, a steering wheel having the decorative layer of the invention can be easily manufactured by hydraulic transfer and by the application of the coating agent.

The printed layer is desirably formed by deburring work after the molding of the coating layer; the printed layer is thus formed after the deburring action. This enables a steering wheel having a smoother decorative layer to be manufactured while also suppressing the influence of any irregularity of the coating layer.

In the deburring work, moreover, a level difference between a deburred portion and the surrounding general portion is desirably set to no more than 0.5 mm. This enables a smoother decorative layer. With a level difference of more than 0.5 mm, air is entrained at the time of hydraulic transfer. With an air entrainment, the entrained air expands during the drying time for forming the protective coating layer. This may cause an irregularity on the surface of the ring portion. Thus, the level difference between the deburred portion and the surrounding general portion is desirably set at 0.5 mm or less.

The coating layer is made of a thermoplastic resin. Moreover, deburring work is performed by heat treatment to heat and soften a any burrs, and to push such into the surface of the coating layer thereby to eliminate the same. In this deburring action, a heat treatment is employed; this facilitates the deburring work.

In the steering wheel manufacturing process according to the invention, moreover, the steering wheel may be manufactured in the following manner. Specifically, the coating layer is first molded around the core. Next, the printed layer is formed on a portion of the surface of the coating layer by hydraulic transfer. Then, the protective coating layer is formed by applying a coating agent to the surface of the printed layer. A skin is then arranged at the remaining of the surface of the coating layer, thereby to manufacture the steering wheel.

In this manufacture process, it is possible to manufacture a steering wheel which is provided with the printed layer by hydraulic transfer, and the skin, thereby to improve its design effects. Moreover, the steering wheel, as improved to have such improved design effects, can be easily manufactured with reduced numbers of steps and cost.

Still moreover, a process according to the invention may manufacture the steering wheel in the following manner. Specifically, first, a first coating layer is molded by means of a mold around the portion of the ring portion core apart from spoke portions. After this, the printed layer is formed on the surface of the fist coating layer by hydraulic transfer.

Moreover, the protective coating layer is formed by applying a coating agent to the surface of the printed layer. Next, a second coating layer having a different hardness from that of the first coating layer is molded by means of a mold onto the remaining portion around the ring portion core. Moreover, a skin is arranged on the surface of the second coating layer, thereby to manufacture the steering wheel.

The steering wheel thus manufactured has a ring portion equipped with the printed layer by hydraulic transfer, and a skin, so that its design effects are improved. Moreover, the portion of the printed layer and the portion of the skin have a different feeling when touched. As a result, the steering wheel thus manufactured enables an improved grip feeling when gripped.

DESCRIPTION OF THE PREFERRED EMBODIMENTS

The invention will be described in connection with its embodiments with reference to the accompanying drawings. Here, the invention should not be limited to the embodiments. All the modifications of the requisites of the Claims, or equivalents to the requisites, should be considered as included in the scope of Claims.

Figure 1:
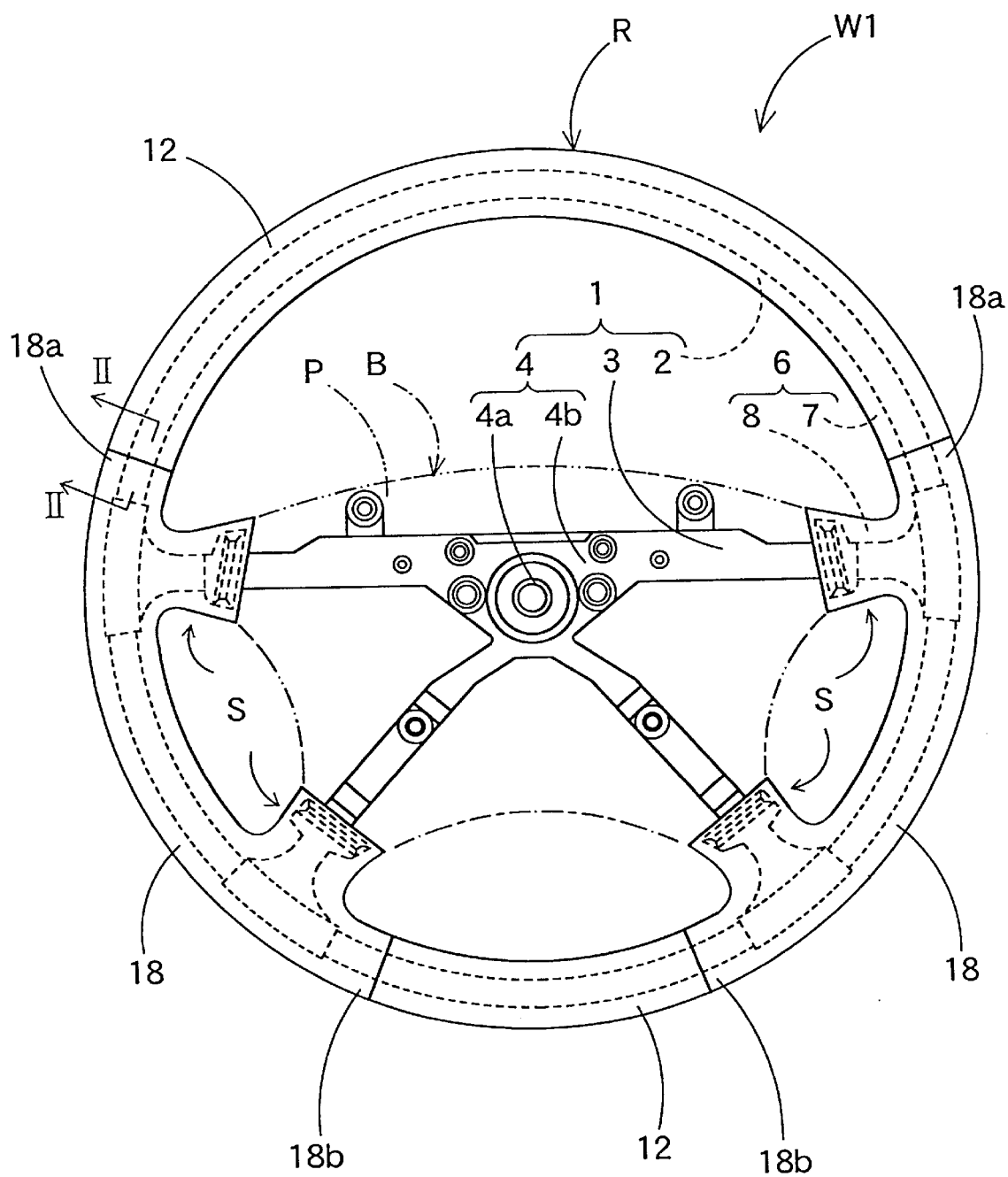
FIG. 1 is a top plan view of a steering wheel according to a first embodiment of the invention.

A steering wheel W1 is constructed, as shown in FIG. 1, to include a ring portion R, a boss portion B, and four spoke portions S. The ring portion R is an annular portion to be gripped at steering time. The boss portion B is arranged at the center of the ring portion R. Each of the spoke portions S joints the ring portion R and the boss portion B. At the steering wheel W, there is arranged a core 1 for jointing the individual portions R, B and S. Specifically, the core 1 is constructed to include a ring portion core 2, a boss portion core 4, and a spoke portion core 3.

Moreover, the ring portion core 2 is made of a steel pipe. The boss portion core 4 has a boss 4a made of a steel material. The spoke portion core 3 and a boss plate portion 4b covering the boss 4a of the boss portion core 4 are die-cast with an aluminum alloy or the like. Here, the boss 4a of the boss portion core 4 is jointed to the steering shaft of a vehicle.

The ring portion core 2 and the portion of each spoke portion core 3 near the ring portion core 2 are coated with a coating layer 6 made of a thermoplastic elastomer of olefin. In the case of the embodiment, this coating layer 6 is given a hardness (JIS A) of 70. Moreover, the coating layer 6 is constructed to include a coating layer 7 for coating the ring portion core 2 and a coating layer 8 for coating the spoke portion core 3.

On the coating layer 7 coating the ring portion core 2, moreover, there is formed a decorative layer 12 on the surfaces on the front side and the rear side of the ring portion R. On the surfaces of the coating layer 7 on the two right and left sides of the ring portion R, there is arranged a skin 18 which is made with stitching leather.

Figure 2:
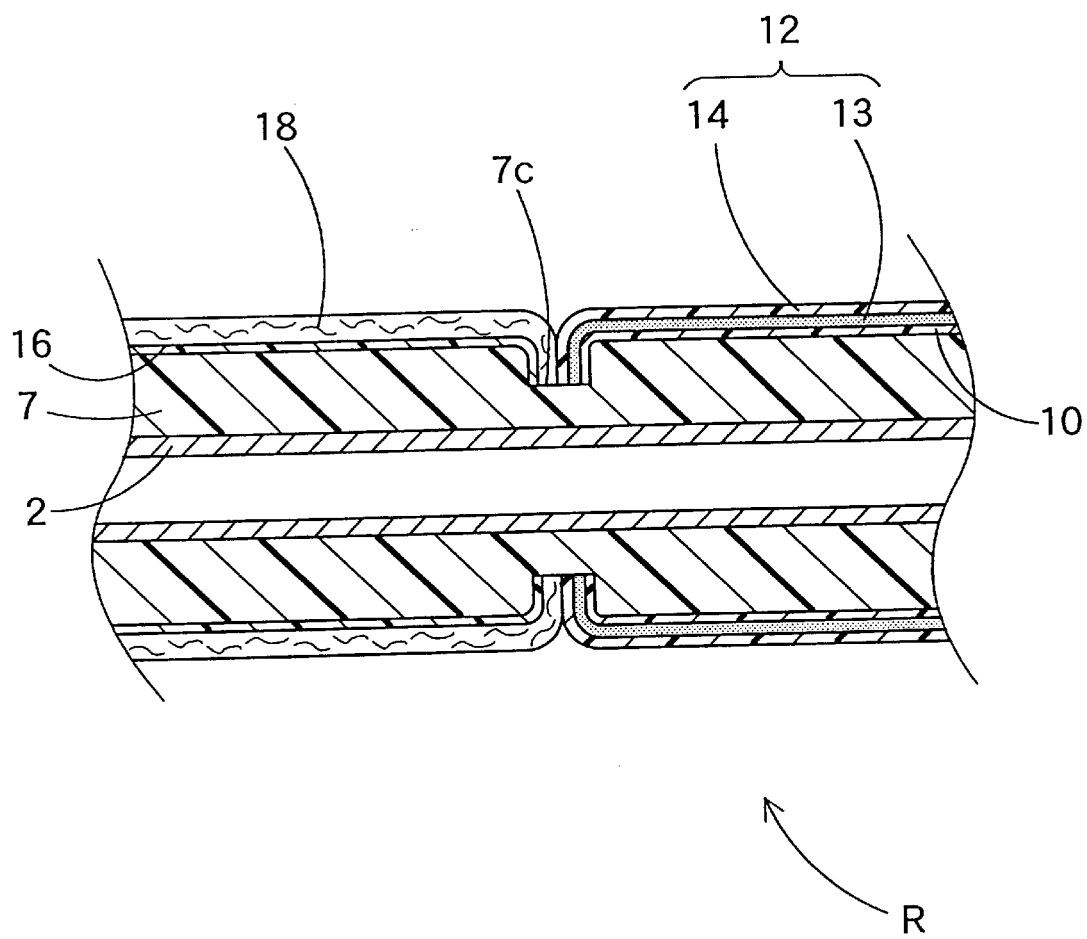
FIG. 2 is an enlarged sectional view of a portion taken along line II—II of FIG. 1.

The decorative layer 12 is constructed, as shown in FIG. 2, to include a printed layer 13 and a protective coating layer 14. The printed layer 13 is arranged to cover the surface of the coating layer 7. Moreover, this printed layer 13 is formed by hydraulic pressure. The protective coating layer 14 is made of a transparent material. In order to protect the printed layer 13, moreover, the protective coating layer 14 is arranged to cover the surface of the printed layer 13. Here, a member, as designated by numeral 10 in FIG. 2, is made of a primer. Moreover, a member 16 shown in FIG. 2 is an adhesive for adhering the skin 18 to the coating layer 7.

Here will be described a process for manufacturing the steering wheel W1. First, the core 1 is set in a mold 20 in an opened state, as shown at A in FIG. 3. The mold 20 is used for injection-molding the coating layer 6. Then, the mold 20 is clamped, and a molding material is poured into the cavity of the mold 20. After the molding material has set, the mold is opened to part the molding, as shown at B in FIG. 3.

Figure 3:
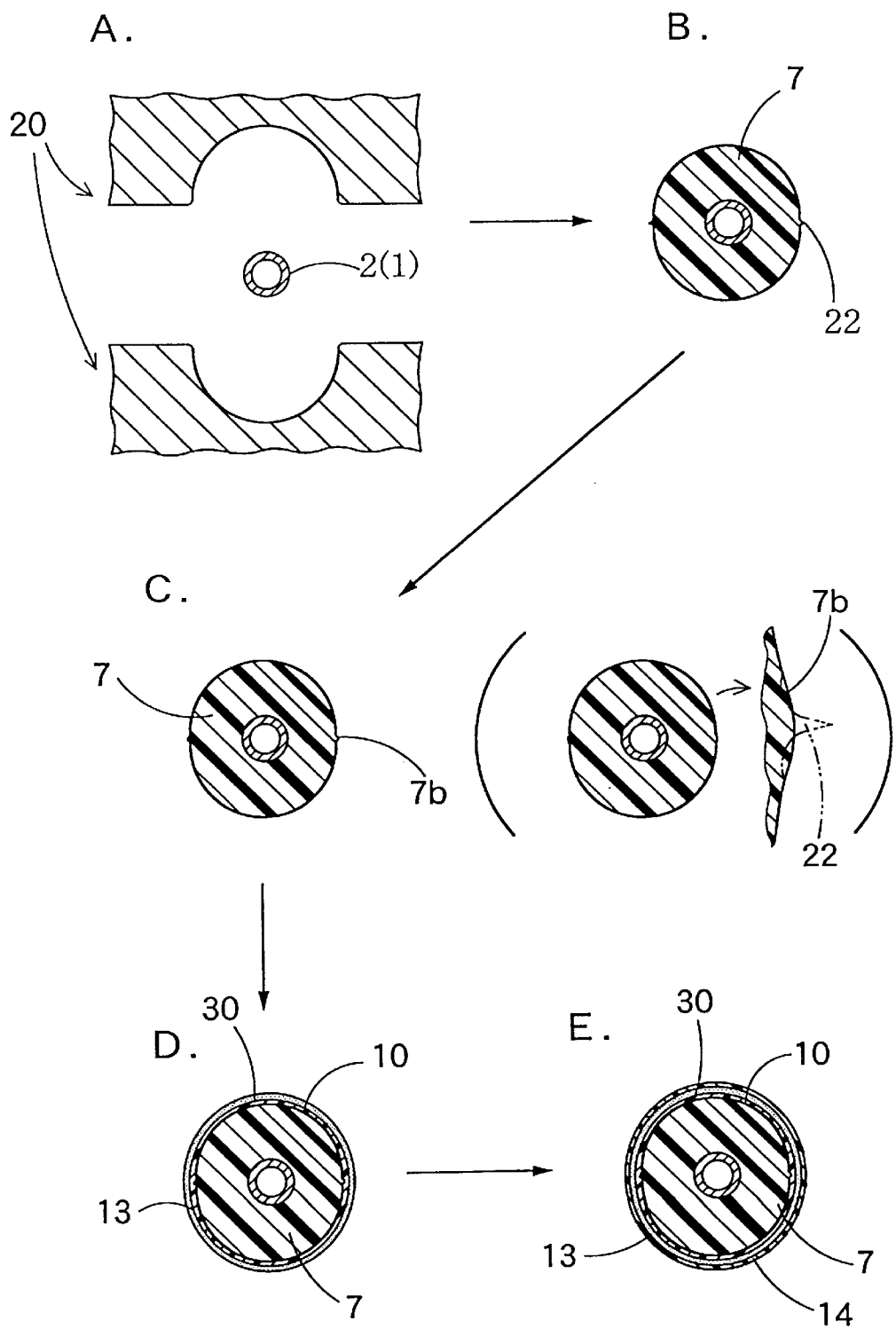
FIG. 3 presents diagrams showing a process for manufacturing the same embodiment.
Figure 4:
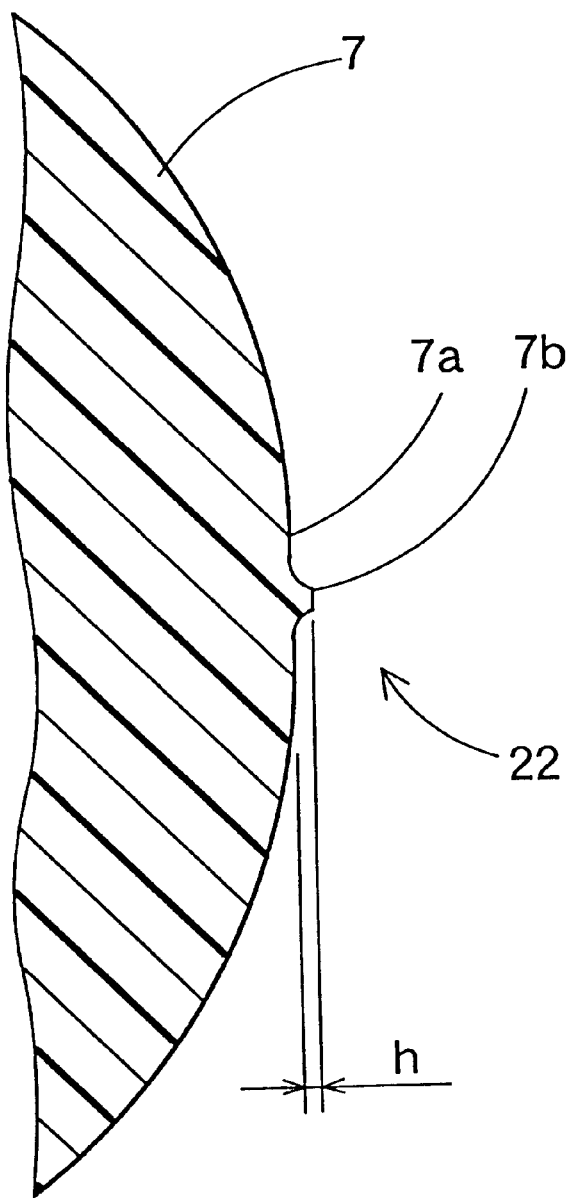
FIG. 4 is an enlarged view for explaining a deburred state of the same embodiment.

Next, a burr (flash) 22 is removed, as shown at C in FIG. 3 and in FIG. 4. The deburring work is performed by means of a cutter. Here, this deburring work may also be performed by grinding the flash with sand paper or the like, or by polishing it with a buffer. In this case, a level difference h between a deburred portion 7b and a surrounding general portion 7a is set at 0.5 mm or less. Here in this embodiment, the level difference h is set at 0.2 mm.

After this, the surfaces of the coating layer 7 on the right and left of the ring portion R are masked. Then, the primer 10 is applied to the surfaces of the coating layer 7 on the front and rear sides of the ring portion R. After this, the printed layer 13 is formed by hydraulic transfer, as shown at D in FIG. 3.

This hydraulic transfer is a general one that uses a transfer sheet. This transfer sheet is constructed by printing a released sheet with the printed layer 13. This printed layer 13 is given a thickness of 1 to 3 microns. Moreover, the printed layer 13 is printed with a predetermined grain pattern or the like. On the other hand, the transfer sheet is provided on its water surface side with a water-soluble resin layer. This water-soluble resin layer is formed of polyvinyl alcohol or the like, and has a thickness of about 10 microns.

Figure 5:
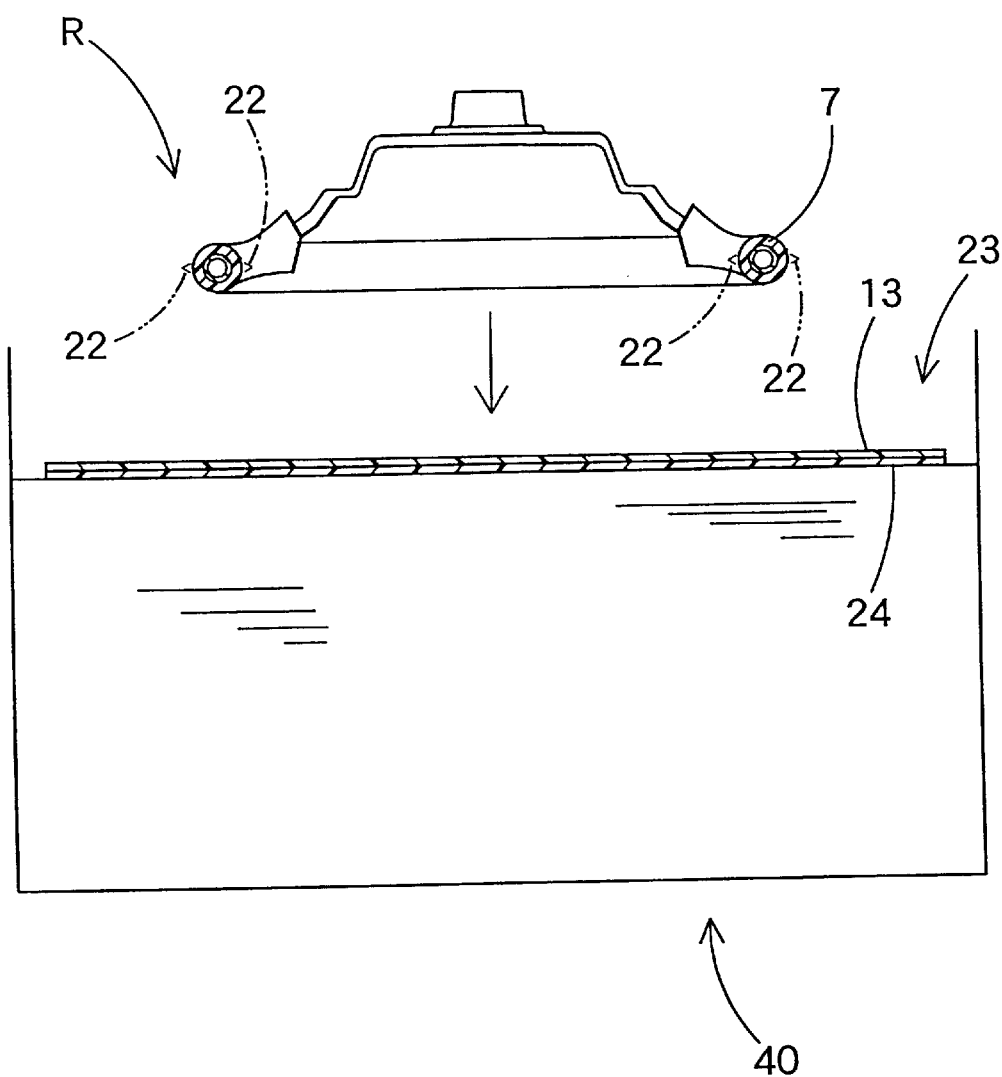
FIG. 5 is a diagram for explaining the same embodiment when hydraulically transferred.
Figure 6:
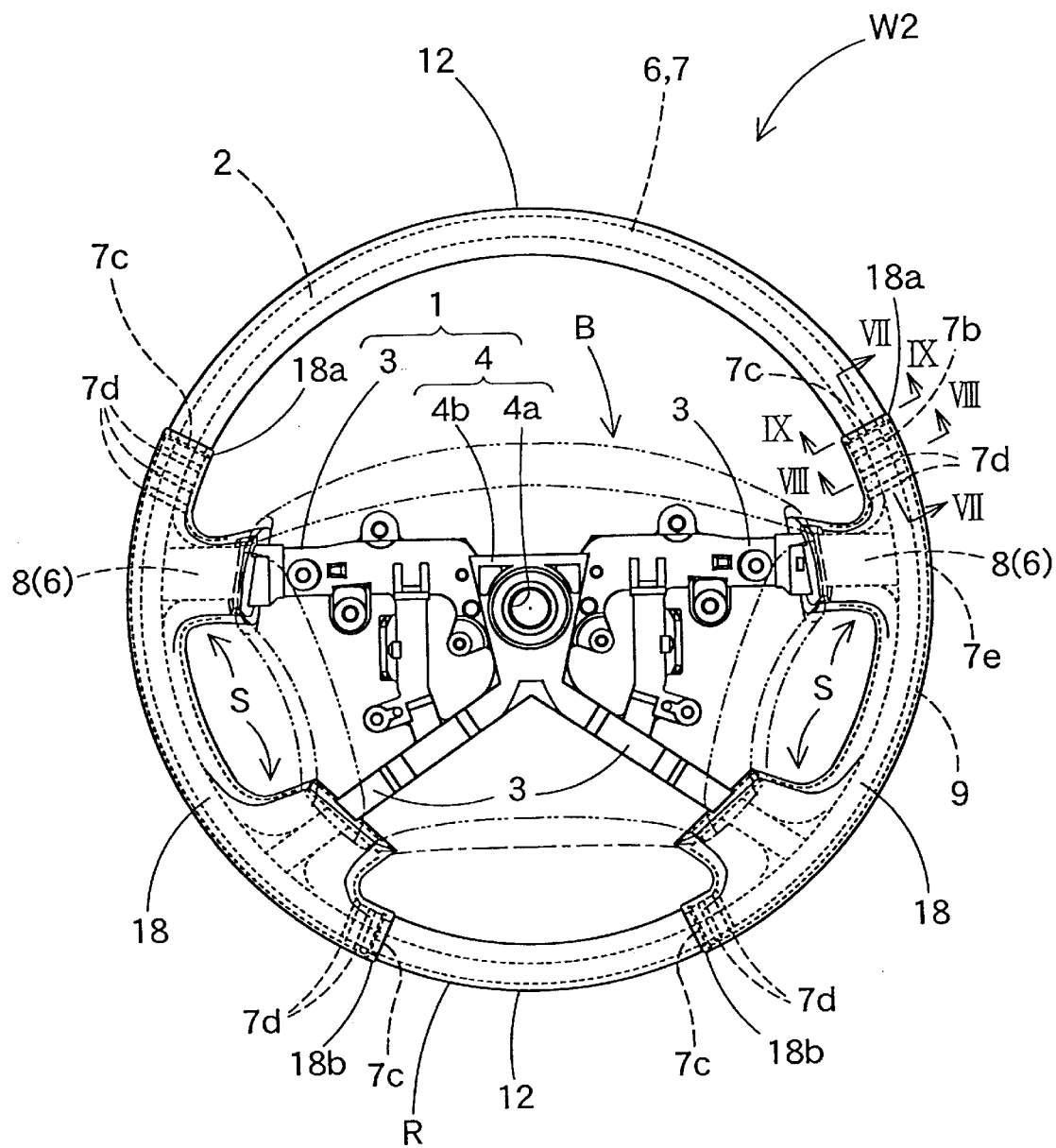
FIG. 6 is a top plan view showing a steering wheel according to a second embodiment.

Hydraulic transfer is performed according to the following process. As shown in FIG. 5, a transfer sheet 23 peeling the released sheet is placed such that it floats on the water surface of a water bath 40 with its water-soluble resin layer 24 being directed downwards. Next, a thinner or the like is sprayed on the predetermined surface of the coating layer 7 so as to activate the ink or paint to form the printed layer 13 of a grain pattern or the like. Then, the ring portion R of the steering wheel W1 is pushed onto the transfer sheet 23 to transfer the grain pattern printed layer 13 to the surface of the coating layer 7. Then, the transfer work is ended by rinsing the transferred portion.

Here in this hydraulic transfer, the steering wheel W1 is submerged into the water from its upper face side, as taken when the steering wheel W1 is mounted on the vehicle, of the ring portion R, and the printed layer 13 is transferred to the coating layer 7. On the lower face side of the ring portion R at mounting time, the end portions of the printed layers 13 to be transferred from the two sides of the section of the ring portion R impinge upon each other. As shown at D and E in FIG. 3, therefore, a discontinuous portion 30 of the pattern is left on the printed layer 13. However, this discontinuous portion 30 establishes no level difference on the surface of the ring portion R. This is because at the rinsing time, the water-soluble resin layer 24 is dissolved and removed to leave only the thickness of the printed layer 13. This is also because the printed layer 13 itself is thin. Moreover, the discontinuous portion 30 does not engender a fear that the appearance/design of the steering wheel W1 will be degraded. This is because the discontinuous portion 30 is arranged on the lower face side of the ring portion R at mounting time.

After the hydraulic transfer, the protective coating layer 14 having a thickness of about 100 to 600 microns is formed on the surface of the printed layer 13, as shown at E in FIG. 3. This coating layer 14 is formed by applying a coating agent such as a transparent polyurethane/acryl resin or polyester resin to the surface of the printed layer 13. Moreover, the coating agent is dried to form the coating layer 14. Here, this protective coating layer 14 is as hard as the coating layer 7.

After this, the masking is removed, and the adhesive 16 is applied to both surfaces of the coating layer 7, to the right and left surfaces of the ring portion R, and to the surface of the spoke portion coating layer 8. If the skin 18 is stitched and arranged on the surface of the adhesive 16, the steering wheel W1 of the first embodiment can be manufactured.

Here, when the steering wheel W1 is mounted on the actual vehicle, a lower cover or pad P is mounted on the boss portion B.

In the steering wheel W1 of the first embodiment, moreover, the decorative layer 12 to be arranged on the surface of the coating layer 7 is constructed to include the printed layer 13 and the protective coating layer 14. The printed layer 13 is formed by hydraulic transfer. The protective coating layer 14 is made of a transparent material and covers the surface of the printed layer 13 so as to protect it.

Specifically, the printed layer 13 formed by hydraulic transfer can be formed with a small (e.g., about 1 to 3 microns) and uniform thickness, even if the printed face is curved. In other words, the printed layer 13 having a small and uniform thickness can be formed on the surface of the coating layer 7 or the printed face even if this surface is curved. As a result, the surface of the decorative layer 12 can be smoothed so as to easily form the smooth decorative layer 12 on the surface of the ring portion R. It is quite natural that the printed layer 13 be covered with the protective coating layer 14. This promotes the durability of the ring portion R. Specifically, the printed layer 13 is not scraped off, even when the ring portion R is gripped and operated. As a result, the ring portion R can be prevented from being degraded in its appearance even when the ring portion R is gripped and operated.

In the steering wheel W1 of the first embodiment, moreover, the decorative layer 12 is arranged at a position apart from the spoke portions S in the ring portion R. In other words, the printed layer 13 need not be formed in the vicinity of the spoke portions S, which are largely curved three-dimensionally on the surface of the coating layer 7 of the ring portion R at the time of hydraulic transfer of the printed layer 13. This enables a prevention of runs in the pattern of the printed layer 13 in the steering wheel W1 of the first embodiment. Such pattern runs are liable to occur on the surface of the spoke portion coating layer 8, as such is complexly curved. As a result, the printed layer 13 having a decorative pattern can be achieved for this steering wheel W1.

Especially in the steering wheel W1 of the first embodiment, the printed layer 13 is formed apart from the spoke portions S and at such a portion that the section of the ring portion R has an identical section in the direction for forming the ring portion R. In this steering wheel W1, specifically, the face to form the printed layer 13 is not influenced in the least by the curved shape of the coating layer 8 of the spoke portions S. In the steering wheel W1, therefore, it is possible to form the printed layer 13 with a more decorative pattern.

In the first embodiment, on the other hand, the hardness (e.g., JIS A) of the coating layer 7 is made to be as low as 70. This establishes a soft feeling when the ring portion R is gripped.

Here, if the hardness (JIS A) of the coating layer 7 is set at 40 to 90, the above-specified effect can be achieved. At this time, the hardness of the protective coating layer 14 is equalized to that of the coating layer 7. Here, if the hardness (JIS A) of the coating layer 7 is less than 40, the coating layer 7 is so soft that the steering wheel W1 becomes hard to steer. If the hardness (JIS A) of the coating layer 7 is more than 90, on the other hand, the ring portion R gives a hard feeling.

Moreover, the coating layer 6 may be made of a synthetic resin such as polypropylene, and the coating layer 7 may be given a hardness (JIS A) of 95 or higher. In this case, a hard grip feeling can be achieved when the ring portion R is gripped. Moreover, when the hardness level of the coating layer 7 is raised, the printed layer 13 may also be given a grain pattern. In this case, there is achieved a feeling as if the ring portion R were made of a wooden material. Thus, the ring portion R can be gripped without any sense of strangeness or incompatibility.

In the manufacture process of the first embodiment, first, the coating layer 7 is molded around the core 2. Next, the printed layer 13 is formed on the surface of the coating layer 7 by hydraulic transfer. Then, the coating agent is applied to the surface of the printed layer 13 to form the protective coating layer 14. With these steps, the steering wheel W1 of the first embodiment having the decorative layer 12 can be easily manufactured.

In the manufacture process of the first embodiment, moreover, after the coating layer 7 has been formed, deburring work is performed to form the printed layer 13. In the steering wheel W1 thus manufactured, therefore, any influences resulting from an irregularity of the coating layer 7 can be suppressed to form a smoother decorative layer 12.

Here, in this deburring work of the embodiment, the level difference h between the deburred portion 7b and the surrounding general portion 7a is made to be as small as 0.2 mm. In the manufactured steering wheel W1, the decorative layer 12 can thus be made far smoother.

Here, the decorative layer 12 can be provided with a smooth feeling if the level difference h is made to be 0.5 mm or less. If the difference h is 0.5 mm or less, moreover, air can be prevented from being entrained at the time of hydraulic transfer. In this way, the quality of the steering wheel W1 can be improved. Here, the following drawbacks arise if a level difference of more than 0.5 mm is caused by the burr 22 formed at the coating layer 7. At the time of hydraulic transfer, more specifically, the printed layer 13 may be transferred while air is entrained around the burr 22. If the printed layer 13 is transferred while entraining air, this air expands at the subsequent drying time or the like when the protective coating layer 14 is formed. As a result, the ring portion R become so rough on its surface that a smooth decorative layer 12 cannot be achieved.

In the deburring work, on the other hand, the burr 22 may be polished off with a buffer. Moreover, a polyester paint may be applied to bury the burr 22, thereby making the burr 22 inconspicuous. It is quite natural that the deburred portion 7b may also be buried in the paint film and made inconspicuous. Specifically, the polyester paint may be applied to the deburred portion 7b after the burr 22 has been removed or polished off. As shown in the parentheses at C of FIG. 3, moreover, the burr 22 may be heated and softened with a burner or hot roller, and may be pushed onto the surface of the coating layer so that it disappears. In the case that the burr 22 is removed by heating and softening, it is naturally necessary to make the coating layer 7 of a thermoplastic resin material.

In the steering wheel W1 of the first embodiment, moreover, the coating layer 7 has grooves 7c into which the end portions 18a and 18b of the skin 18 are to be in folded. If the portion of the groove 7c is cracked or deformed at the time of molding the coating layer 6, the following countermeasures may be performed. Specifically, slits 7d are formed in a steering wheel W2 according to a second embodiment, as shown in FIGS. 6 to 9.

Here, the portion of the groove 7c is liable to be cracked or deformed by the molding shrinkage of the coating layer 6. The crack or deformation at the portion of the groove 7c will induce deterioration of the appearance of the ring portion R. Moreover, a crack or deformation of the groove 7c makes it impossible to fit the skin 18 in the groove 7c.

Figure 8:
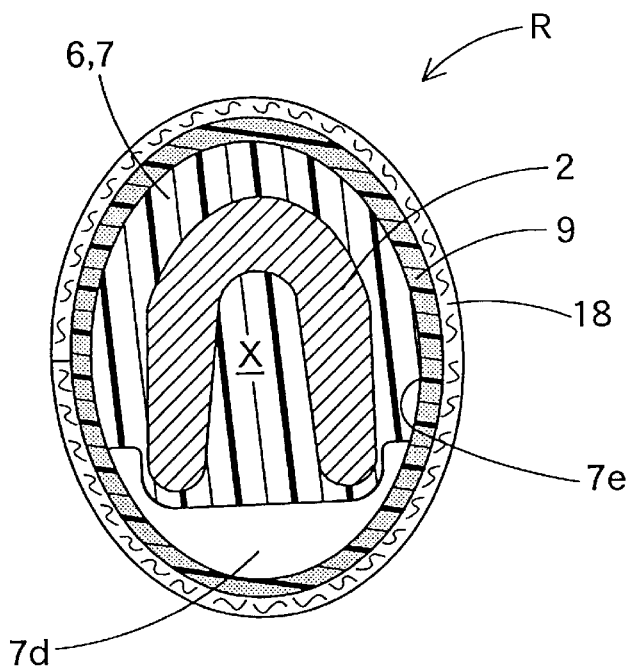
FIG. 8 is an enlarged section of a portion of the ring portion of the same embodiment and corresponds to a portion VIII—VIII of FIG. 6.
Figure 9:
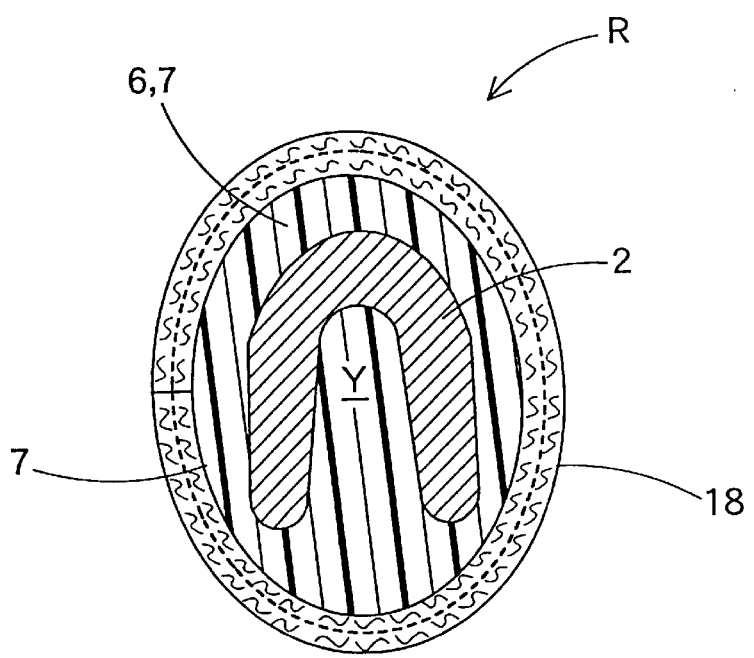
FIG. 9 is an enlarged section of a portion of the ring portion of the same embodiment and corresponds to a portion IX—IX of FIG. 6.

The ring portion core 2 of this steering wheel W2 is die-cast with an aluminum alloy or the like. The ring portion core 2 is formed to have a section shaped like an inverted letter "U", as shown in FIGS. 8 and 9. This ring portion core 2 is coated on its whole circumference, as taken in the circumferential direction thereof, with the coating layer 6 made of a hard synthetic resin. This coating layer 6 is constructed to include the coating layer 7 for coating the ring portion core 2, and the coating layer 8 for coating the spoke portion core 3.

On the surfaces of the coating layers 7 and 8 of the right and left ring portions R in the steering wheel W2, as mounted on the vehicle, there is wound the skin 18. This skin 18 of the embodiment is made of a natural leather, but it may also be made of a synthetic resin. When the skin 18 is extended, its portion appearing on the upper face side of the ring portion R, and its portion appearing on the lower face side of the ring portion R, are jointed at its portion appearing on the outer circumferential side of the ring portion R. When the skin 18 is wound on the ring portion R, moreover, it is folded to fit its end portions 18a and 18b into the groove. Moreover, the skin 18 is stitched at its two edges on the inner circumferential side of the ring portion R.

On the surface of the coating layer 7 of the ring portion R on the front and rear sides of the steering wheel W2 as mounted on the vehicle, moreover, there is formed the decorative layer 12 which has a grain pattern printed by hydraulic transfer. This decorative layer 12 is constructed to include a printed layer on the side of the coating layer 7 by hydraulic transfer, and a transparent protective coating layer for protecting the printed layer.

Figure 7:
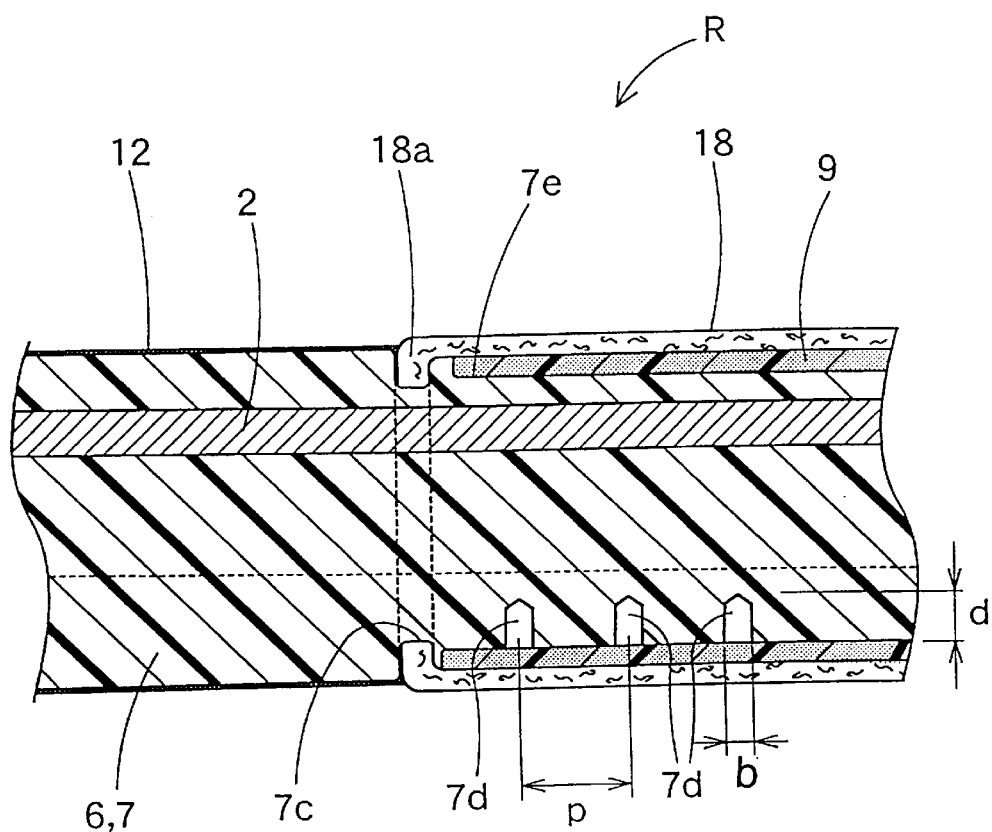
FIG. 7 is an enlarged section of a portion of the ring portion of the same embodiment and corresponds to a portion VII—VII of FIG. 6.

The coating layer 7 has fitting grooves 7c at its right and left portions longitudinally of the ring portion R. In each fitting groove 7c, there is folded one of the two end portions 18a and 18b of the skin 18, as taken in the circumferential direction of the plane of the ring portion R. In the coating layer 7, as shown in FIGS. 7 and 9, the fitting groove 7c is arranged in an annular shape entirely around the circumference of the section of the ring portion R.

In the coating layer 7, moreover, there are arranged slits 7d which are formed in the circumferential direction of the section of the ring portion R at the portions to be covered with the skin 18 in the vicinity of each fitting groove 7c. Of the slits 7d, there are arranged on the side of the front end portion 18a of each skin 18, and two are arranged on the side of the rear end portion 18b. These slits 7d are opened in the lower face side of the ring portion R, as shown in FIGS. 7 and 8.

In the embodiment, each slit 7d is given a width b of 2 mm, a depth d of 4 mm, and a pitch p of 10 mm.

In the coating layer 7, moreover, the slits 7d are so arranged that a sectional area X may be smaller than a sectional area Y. The sectional area X is taken at the coating layer 7 at the portion where the slits 7d are arranged. The sectional area Y is taken at the coating layer 7 at the portion where the fitting grooves 7c are arranged.

Here in the embodiment, the coating layer 7 is provided with a recess 7e (as shown in FIG. 7), which is arranged in the arranged portion of the skin 18 for providing a cushion layer 9. This cushion layer 9 is provided for an improved feeling when the ring portion R is gripped. Moreover, the recess 7e is given a depth that is substantially equal to that of the fitting groove 7c. Still moreover, the slit 7d is arranged in the bottom face of the recess 7e. This arrangement ensures that the sectional area X of the coating layer 7 at the portion where the slits 7d are arranged is smaller than the sectional area Y of the coating layer 7 at the portion where the fitting groove 7c is arranged.

Here, the cushion layer 9 is formed by adhering sponge rubber to the recess 7e of the coating layer 7.

Here will be described a process for manufacturing the steering wheel W2 of the second embodiment. First, the boss 4a of the boss portion core 4 is set in the die-casting mold. With the die-casting, the steering wheel core 1 is prepared. In this die-casting, the boss plate portion 4b of the boss portion core 4, the spoke portion core 3, and the ring portion core 2 are formed.

Next, the core 1 is set in the mold for the coating layer 6. This coating layer 6 (as are the coating layers 7 and 8) is formed by the injection-molding method. At this time, the coating layer 6 of a hard synthetic resin is provided, at its portion to be covered with the skin 18, with the slits 7d extending in the circumferential direction of the section of the ring portion R.

A molding shrinkage occurs in the coating layer 7 when this layer is molded. In the coating layer 7, there is also established such an internal stress that the layer 7 shrinks in the circumferential direction of the plane of the ring portion R. However, the portion of the slits 7d in the circumferential direction of the section of the coating layer 7 is deformed to widen the slits 7d. This prevents the stress from being concentrated only in the portion of the fitting grooves 7c. As a result, the cracking or deformation that might otherwise result in defective products, of the fitting grooves 7c portion can be suppressed.

After the formation of the coating layer 6, deburring work is performed. Then, the portion to be wound by skin 18 is masked. Moreover, a predetermined primer is applied to the portion to be provided with the decorative layer 12. Then, a printed layer of a grain pattern is formed by hydraulic transfer on the portion to be provided with the decorative layer 12. In addition, a polyurethane or acryl resin, or a polyester resin, is applied to the surface of the printed layer to form a transparent protective coating layer. By these processes, the decorative layer 12 is formed.

After this, the cushion layer 9 is adhered to the recess 7e by means of an adhesive. By means of this adhesive, the end portions 18a and 18b are folded and fitted in the fitting grooves 7c. At the same time, the skin 18 is wound, while being stitched on the inner circumference sides of the ring portion R, onto the surface of the cushion layer 9. As a result, the steering wheel W2 can be manufactured.

In this steering wheel W2, an internal stress due to the molding shrinkage is established at the time of forming the coating layer 6 (including the coating layers 7 and 8) such that the coating layer 7 is shrunk in the circumferential direction of the plane of the ring portion R. However, the slits 7d portion of the coating layer 7 is deformed such that it is widened. This prevents the stress from being concentrated only at the portion of the fitting grooves 7c.

As a result, defective cracking or deformation of the fitting grooves 7c portion can be suppressed.

Moreover, the slits 7d portion is covered, even if such are cracked or deformed, with the skin 18. This prevents the steering wheel W2 from having a deteriorated appearance at the ring portion R.

In the steering wheel W2 of the second embodiment, therefore, the manufacture yield can be improved by suppressing defects at the time of molding the coating layer 6. After the molding step, moreover, the end portions 18a and 18b of the skin 18 can be smoothly folded into the fitting grooves 7c.

In the steering wheel W2 of the second embodiment, moreover, the coating layer 7 comprised of a hard synthetic resin is provided with the slits 7d extending in the circumferential direction of the ring portion R section. Thus the rigidity of the ring portion R can be lowered, even if the ring portion core 2 is coated with the coating layer 7. As a result, the ring portion R can be smoothly deformed when an impact acts thereupon. In other words, the energy of an impact acting on the ring portion R can be effectively absorbed.

In the steering wheel W2 of the second embodiment, moreover, the slits 7d are arranged on the lower face side of the ring portion R. Into the portion where the slits 7d are arranged, the skin 18 is liable to fall. However, this falling in the skin 18 will not occur on the observable upper face side of the ring portion R. This makes it possible to minimize any deterioration in the appearance and design of the steering wheel W2. If this point is not of special consideration, it is quite natural for the slits 7d to be arranged on the upper face side of the ring portion R. In addition, annular slits similar to the fitting grooves 7c may be formed entirely around the circumferential direction of the section of the ring portion R.

In the steering wheel W2 of the second embodiment, still moreover, the slits 7d are so arranged in the coating layer that sectional area X may be smaller than sectional area Y. Sectional area X is that of the coating layer 7 at the portion where the slits 7d are arranged. Sectional area Y is that of the coating layer 7 at the portion where the fitting grooves 7c are arranged. As a result of this difference between the sectional areas, the stress concentration at the time of the molding shrinkage acts without fail on the slits 7d. In this steering wheel W2, therefore, cracking or deformation, which might otherwise result in defects, can be more suppressed in the portion where the fitting grooves 7c are arranged.

In this steering wheel W2, still moreover, the slits 7d in the vicinity of the fitting grooves 7c are provided in plurality. Thus, the stress concentration due to molding shrinkage is dispersed among the portions of the individual slits 7d. As a result, the steering wheel W2 enables a greater controlling of the cracking which might otherwise be caused by molding shrinkage at the portion where the fitting grooves 7c are arranged.

Especially in the steering wheel W2 of the second embodiment, many slits 7d are arranged on the front side of the longer span in the ring portion R between the spoke portions S. The longer-span front side of the ring portion R between the spoke portions S is subject to a larger molding shrinkage than that of the shorter rear side of the ring portion R between the spoke portions S. As a result, an increased number of slits 7d are provided at the portion of the front side where the fitting grooves 7c are arranged so that cracking or the like can be more properly prevented.

Figure 10:
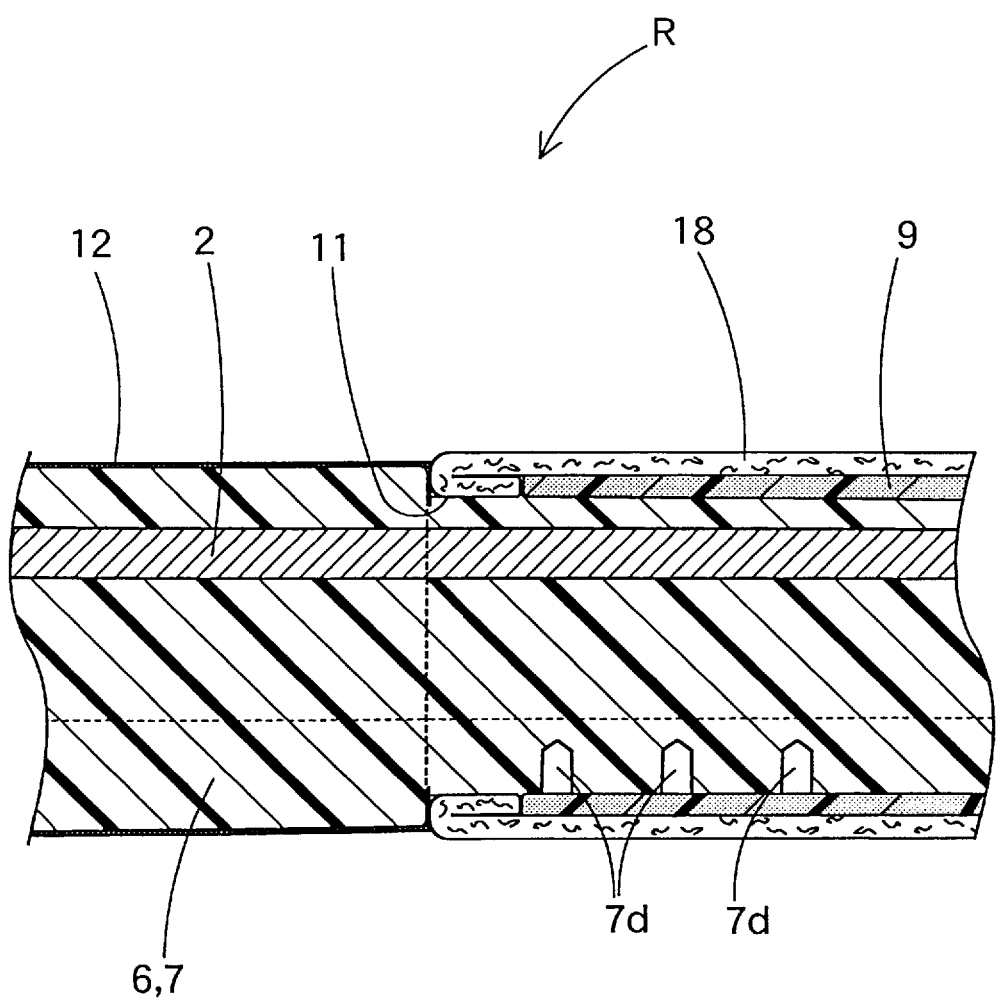
FIG. 10 is an enlarged section showing a portion of the ring portion of a modification of the same embodiment.

Here in the steering wheel W2 of the second embodiment, the portion for folding therein the end portions 18a and 18b of the skin 18 is exemplified by the fitting grooves 7c. In spite of this exemplification, however, the portion for folding the end portions 18a and 18b of the skin 18 may be the portion having a level difference and that includes the grooves 7c. As shown in FIG. 10, more specifically, there is formed, in the coating layer 7, a stepped portion 11 which is recessed from the portion where the skin 18 is not arranged. Then, the skin 18 may be wound on the coating layers 7 and 8 by folding back the end portions 18a and 18b of the skin 18 into the stepped portion 11. The stepped portion in the present invention includes the grooves 7c.

Conversely, the steering wheel W2 of the second embodiment is embodied into a steering wheel having four spokes.

Figure 11:
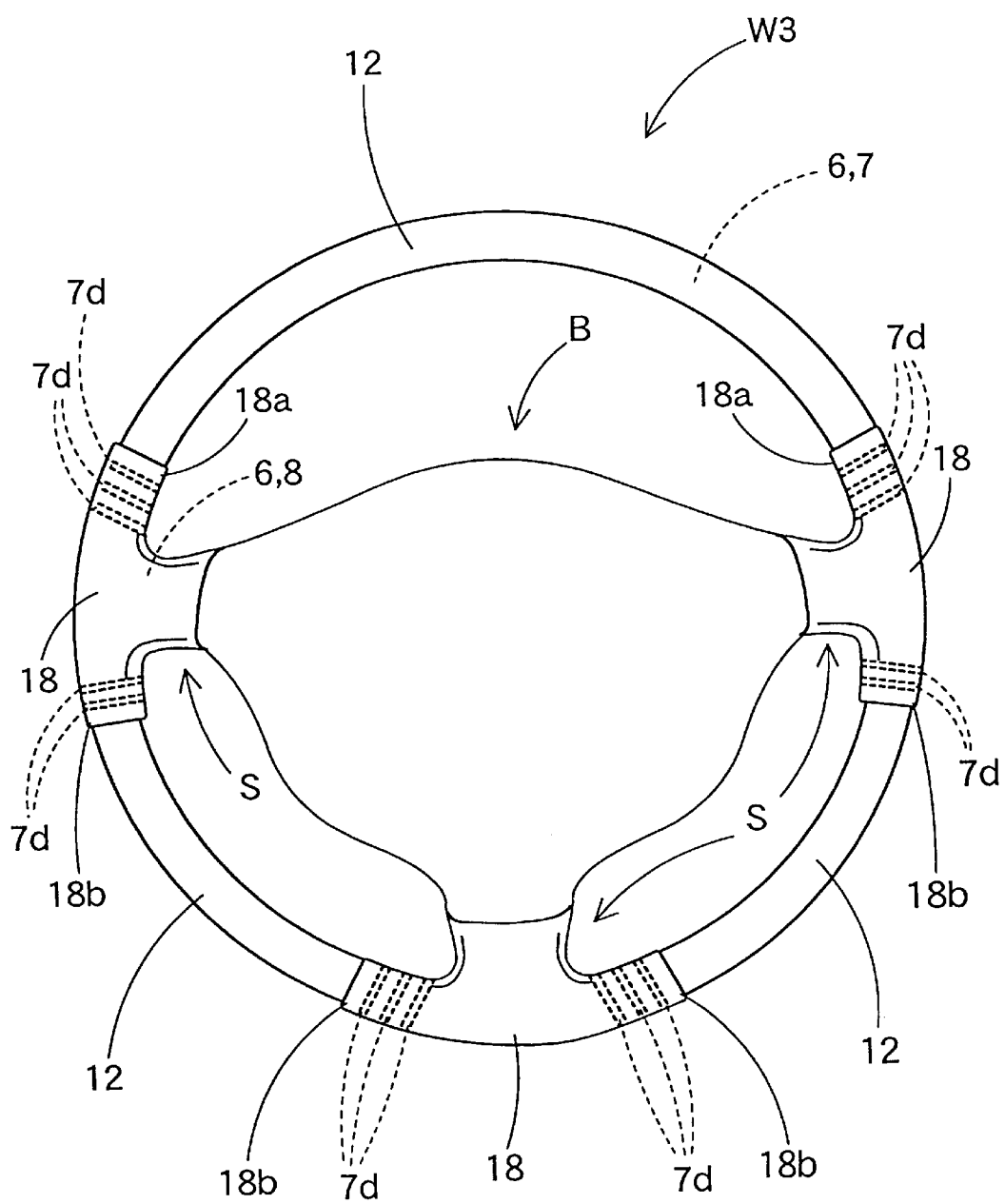
FIG. 11 is a top plan view showing a steering wheel of another modification of the same embodiment.

However, the slits 7d may also be formed in a steering wheel W3 having three spokes, as shown in FIG. 11. In this steering wheel W3 of FIG. 11, the skin 18 is wound on the spoke portions S and on the portions of the ring portion R and the coating layer 6 in the vicinity of the spoke portions S. In the steering wheel W3, moreover, a plurality of slits 7d are arranged in the vicinity of the fitting groove 7c, into which the end portions 18a and 18b of each skin 18 are folded. In this steering wheel W3, as in the steering wheels W1 and W2, the decorative layer 12 of the grain pattern is formed between the skins 18 by hydraulic transfer.

Figure 12:
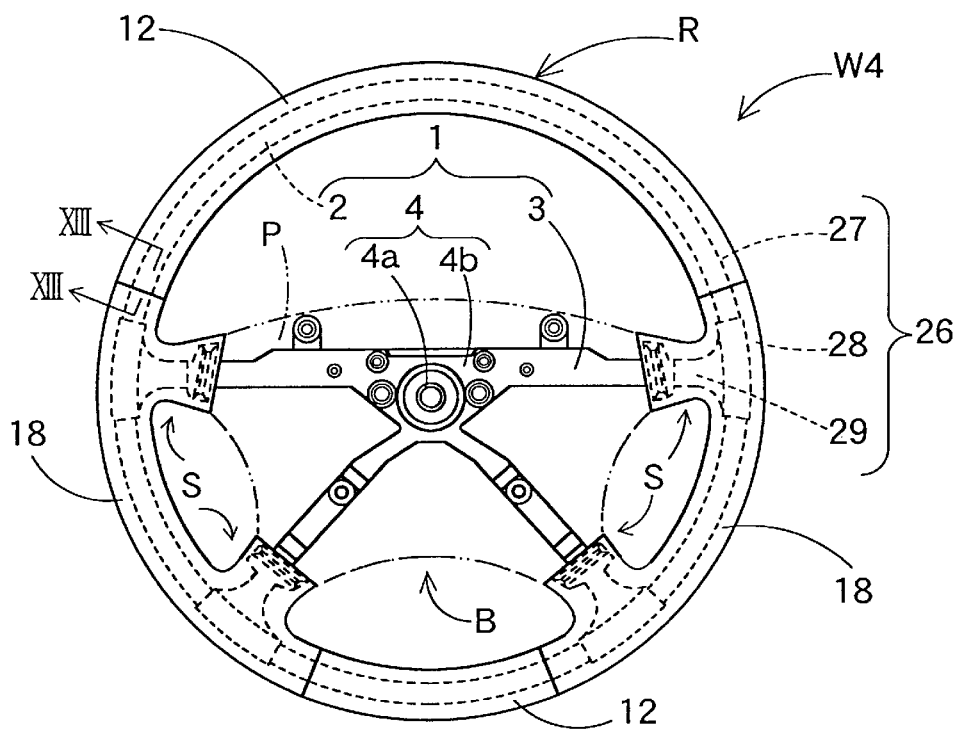
FIG. 12 is a top plan view of a steering wheel of a third embodiment.
Figure 13:
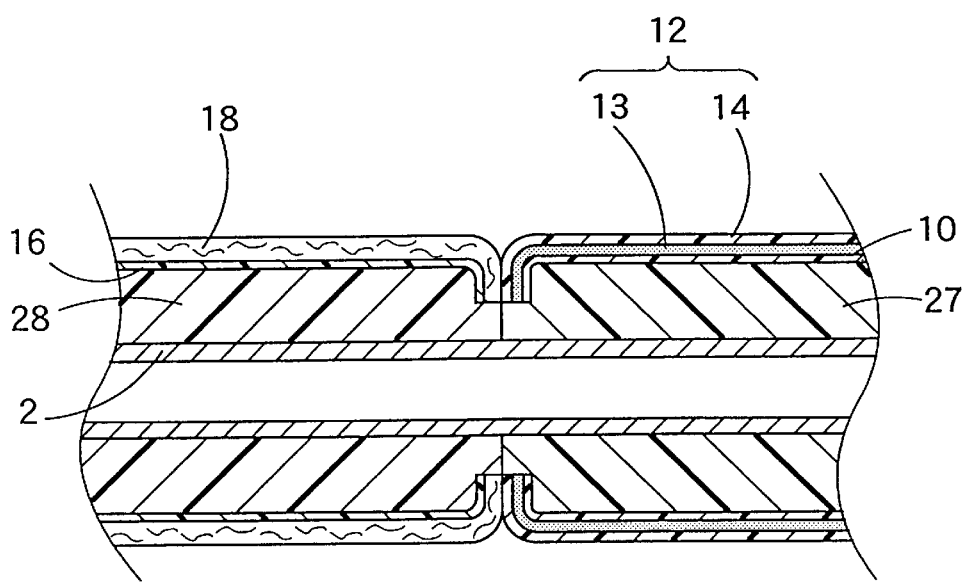
FIG. 13 is an enlarged section of a portion XIII—XIII of FIG. 12.

In a steering wheel W4 of a third embodiment shown in FIGS. 12 and 13, a coating layer 26 for coating the ring portion core 2 and the spoke portion core 3 of the core 1 are constructed to include first and second ring portion coating layers 27 and 28 and a spoke portion coating layer 29. The first ring portion coating layer 27 covers the front side and the rear side of the ring portion core 2. This first ring portion coating layer 27 is made of a hard synthetic resin, such as polypropylene, having a hardness (JIS A) of 97. The second ring portion coating layer 28 covers the both right and left sides of the ring portion core 2. The second ring portion coating layer 28 and the spoke portion coating layer 29 are made of a soft synthetic resin, such as polyurethane, having a hardness (JIS A) of 80. Here, the remaining members are constructed similar to those of the steering wheel W1 of the first embodiment. Thus, the same members as those of the first embodiment will not be described herein, but will instead be designated by the same reference numerals as in the first embodiment.

Here will be described process of manufacturing the steering wheel W4 of this third embodiment. First, the first ring portion coating layer 27 is molded around the portion of the ring portion core 2 that is apart from the spoke portions S. After this, the deburring work is performed by the polishing method using a buffer. At this time, a level difference between the deburred portion and the surrounding general portion is set to 0.5 mm to less. Then, the primer 10 is applied to the surface of the first coating layer 27. After this, the printed layer 13 of a grain pattern is formed by hydraulic transfer. Moreover, a coating agent is applied to the surface of the printed layer 13 to form the transparent protective coating layer 14. Subsequently, the second coating layer 28 and the spoke portion coating layer 29 are molded onto the remaining portion around the ring portion core 2, and onto a portion of the spoke portion core 3. Next, the predetermined adhesive 16 is applied to the surfaces of the second coating layer 28 and the spoke portion coating layer 29. After this, the steering wheel W4 can be manufactured by stitching the skin 18 onto the surfaces of the second coating layer 28 and the spoke portion coating layer 29.

In the steering wheel W4 thus manufactured, the ring portion R is constructed to include the printed layer 13 by hydraulic transfer, and the skin 18. This construction improves the design effects. Moreover, the haptic feeling (the touch feeling) of the ring portion R is hard at the portion of the printed layer 13, and soft at the portion of the skin 18. Thus, this steering wheel W4 enables an improved grip feeling when the ring portion R is gripped.

In the steering wheel W1 of the first embodiment, the coating layer 6 is naturally limited to one kind. This makes it difficult to improve the grip feeling in the steering wheel W1 of the first embodiment. As the steering wheel which has improved design effects by comprising the printed layer 13 by hydraulic transfer, and the skin 18, however, the steering wheel W1 can be easily manufactured with a reduced number of steps, and at a lower cost, than the steering wheel W4. This is because such a steering wheel W1 is not provided with the second ring portion coating layer 2.

Here in the third embodiment, the first coating layer 27 at the portion of the printed layer 13 is made harder than the second coating layer 28 at the portion of the skin 18. Despite this, however, the hardnesses of the first and second coating layers 27 and 28 may be suitably reversed according to the pattern of the printed layer 13 and the kind of skin 18.

Figure 14:
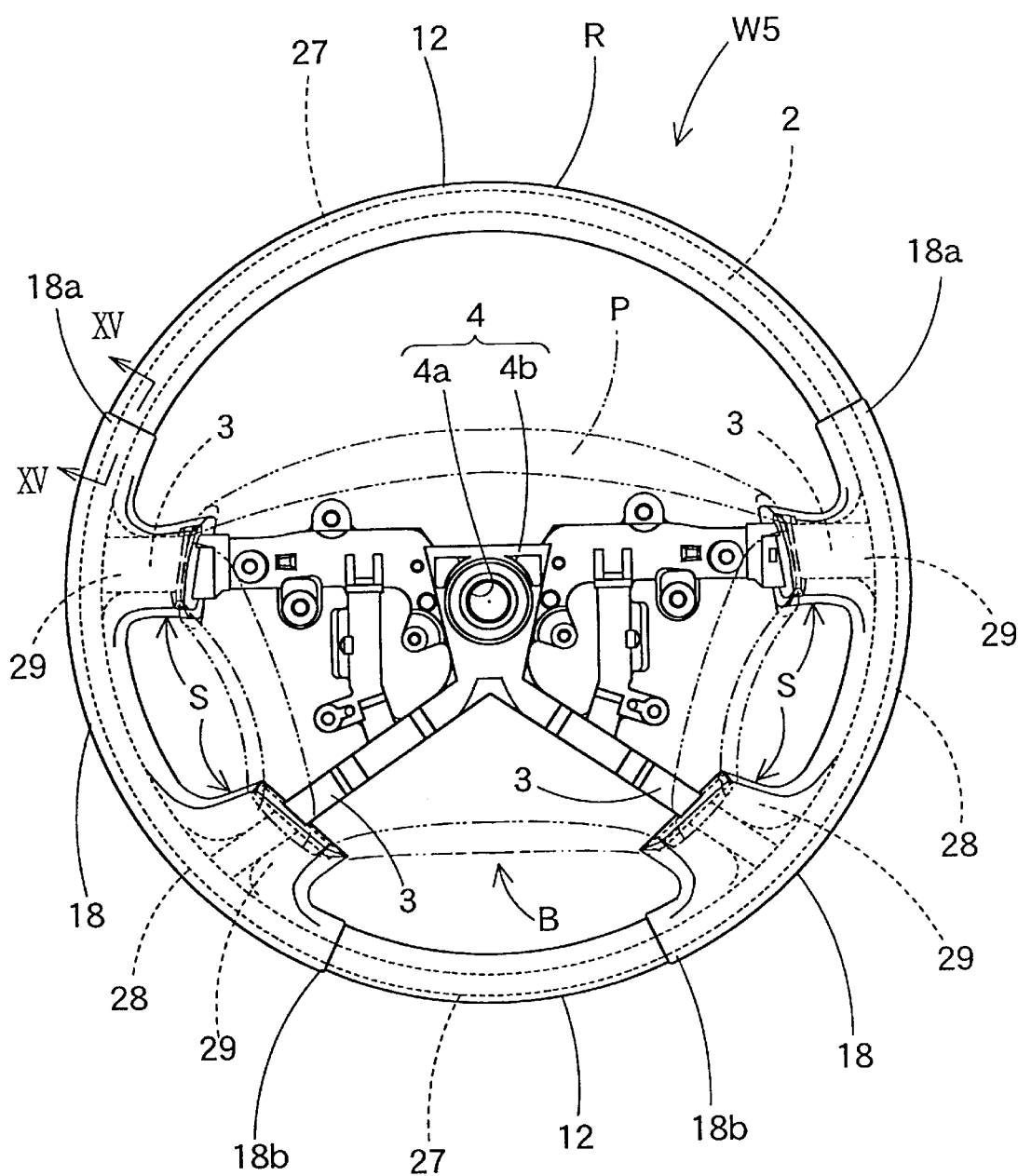
FIG. 14 is a top plan view of a steering wheel of a fourth embodiment.
Figure 15:
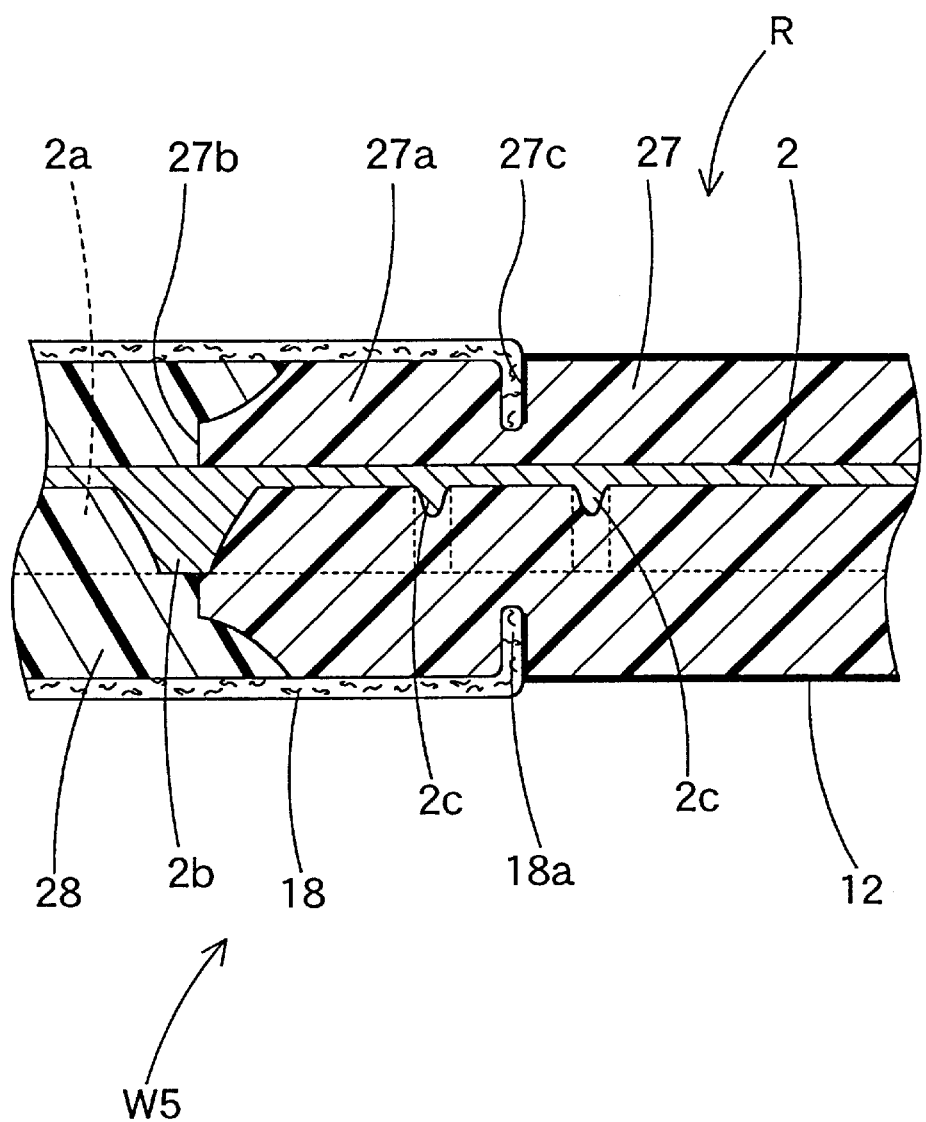
FIG. 15 is an enlarged section of a portion XV—XV of FIG. 14.

In the case where the ring portion core 2 is so modified from the third embodiment as to have a section of a letter "U" shape, moreover, a steering wheel W5 may be constructed according to a fourth embodiment, as shown in FIGS. 14 and 15. In this steering wheel W5, it is possible at the time of molding the first ring portion coating layer 27 to prevent the burr which might otherwise extend along the ring portion core 2 toward the second ring portion coating layer 28.

In the steering wheel W5 of the fourth embodiment, the portion of the boss 4a at the center of the boss portion core 4 in the steering wheel core 1 is made of steel. This boss 4a is connected to the not-shown steering shaft of the vehicle. Moreover, the boss plate 4b of the steering wheel core 1, the spoke portion core 3, and the ring portion core 2 are die-cast with an aluminum alloy or the like.

Figure 16:
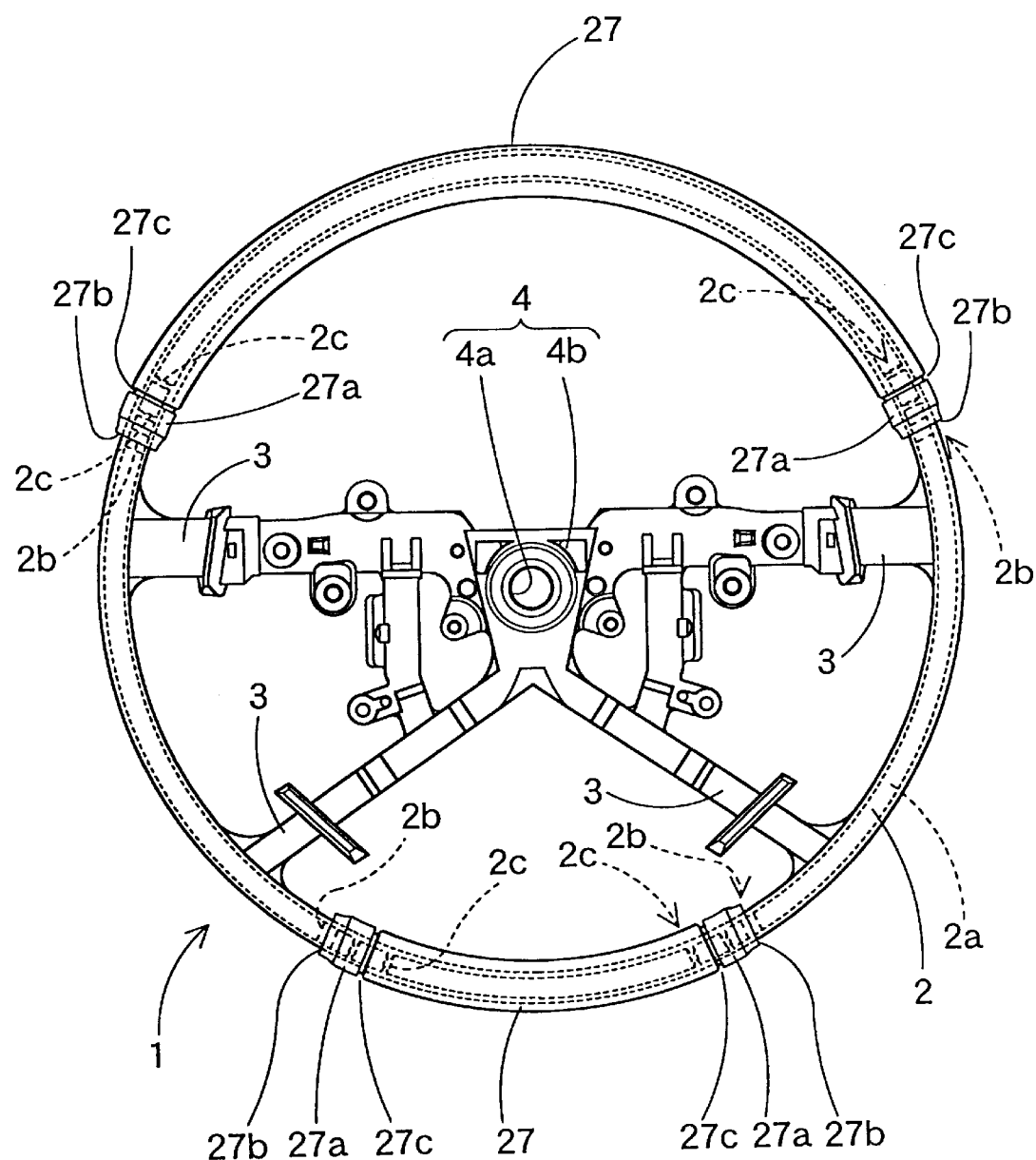
FIG. 16 is a top plan view showing a molded state of a first coated portion of the same embodiment.
Figure 17:
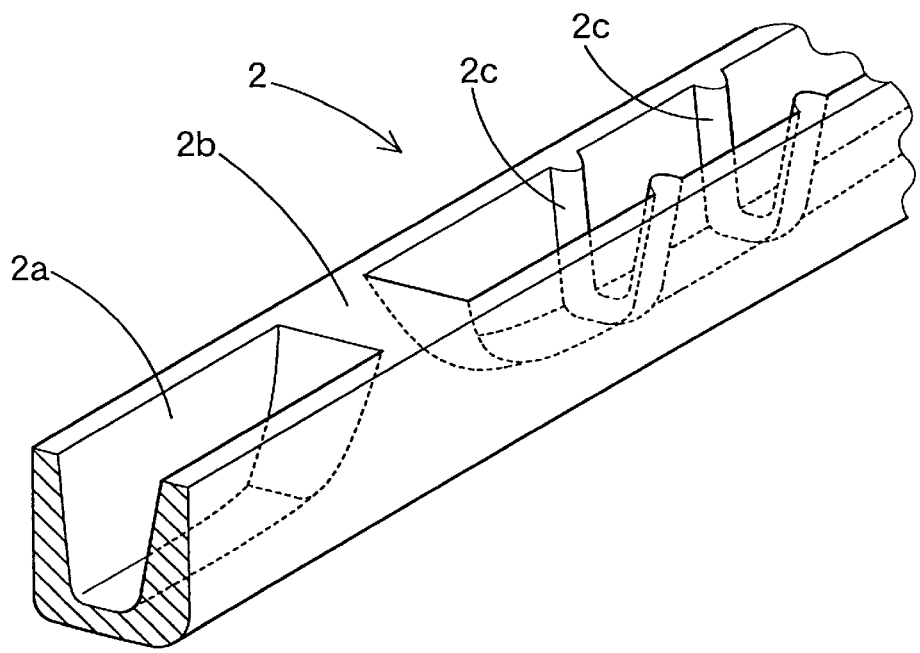
FIG. 17 is an enlarged perspective view of an essential portion, as taken from the bottom face of a ring portion core of the same embodiment.

Moreover, the ring portion core 2 is formed to have a section of a letter "U" shape, as shown in FIG. 17. In the ring portion core 2 of the embodiment, however, there are formed a closed portion 2b and two ridges 2c and 2c in the vicinity of later-described four other portions. The closed portion 2b closes the inner periphery of the U-shaped section. The ridges 2c are formed, in the peripheral direction of the section, on the inner peripheral side of the U-shaped section (as shown in FIGS. 15 and 16).

In the ring portion R, the first coating layer 27 and the second coating layer 28 are arranged, as shown in FIGS. 14 to 16, around the core 2 in the direction for forming the ring portion R, i.e., in the circumferential direction of the plane of the ring portion R. The first coating layer 27 is made of a hard synthetic resin. The second coating layer 28 is made of a softer synthetic resin than that of the first coating layer 27. The skin 18 of leather or the like is stitched and arranged around the second coating layer 28.

In the case of the present embodiment, the two coating layers 27 are arranged at the front and rear portions of the steering wheel W5. The first coating layer 27 is made of a hard synthetic resin such as polypropylene. Moreover, each of the first coating layers 27 is provided at its two end portions 27a with annular grooves 27c. The end portions 18a and 18b of the skin 18 are folded into each annular groove 27c.

A decorative layer 12 is formed at the surface between annular groove 27c and 27c of each first coating layer 27. That is, the decorative layer 12 covers substantially the first coating layer 27 made of hard synthetic resin.

The second coating layer 28 is arranged at the right and left portions of the steering wheel W5. The second coating layer 28 is made, together with the spoke portion coating layer 29, of foamed urethane. These second coating layer 28 and spoke portion coating layer 29 are molded after the first coating layer 27.

A skin 18 covers substantially the second coating layer 28 made of soft synthetic resin. And, the skin 18 is held, near its end portions 18a and 18b, in direct abutment against the outer circumference of the end portion 27a of the first coating layer 27. Moreover, the end portions 18a and 18b are folded and arranged within the annular groove 27c. Here, the skin 18 is stitched inside of the side of the boss portion B in the ring portion R.

At the portions of the ring portion core 2, as located on the individual end faces 27b of the first coating layers 27 and 27, moreover, there are formed the closed portions 2b. Each of these closed portions 2b is formed to close a groove 2a in the inner peripheral side of the U-shaped section. At the portions of the ring portion core 2, as buried in the end portions 27a of the first coating layer 27, moreover, there are formed the two ridges 2c and 2c. These ridges 2c are formed, in the circumferential direction of the section, on the inner peripheral side of the grooves 2a.

Here will be described a process of manufacturing the steering wheel W5 of the fourth embodiment. Incidentally, the steering wheel core 1 is prepared by the die-casting method, with the boss 4a being set in a predetermined die-casting mold.

Figure 18:
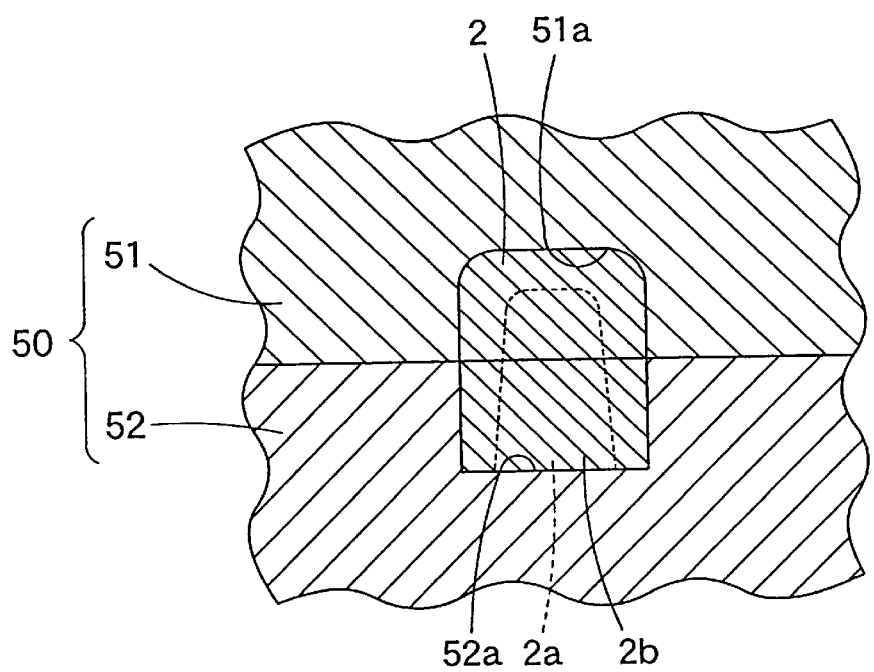
FIG. 18 is a section of a boundary portion of the first and second coated layers when a first coated portion of the same embodiment is molded; this section is taken along the circumferential direction of the section of a ring portion core.
Figure 19:
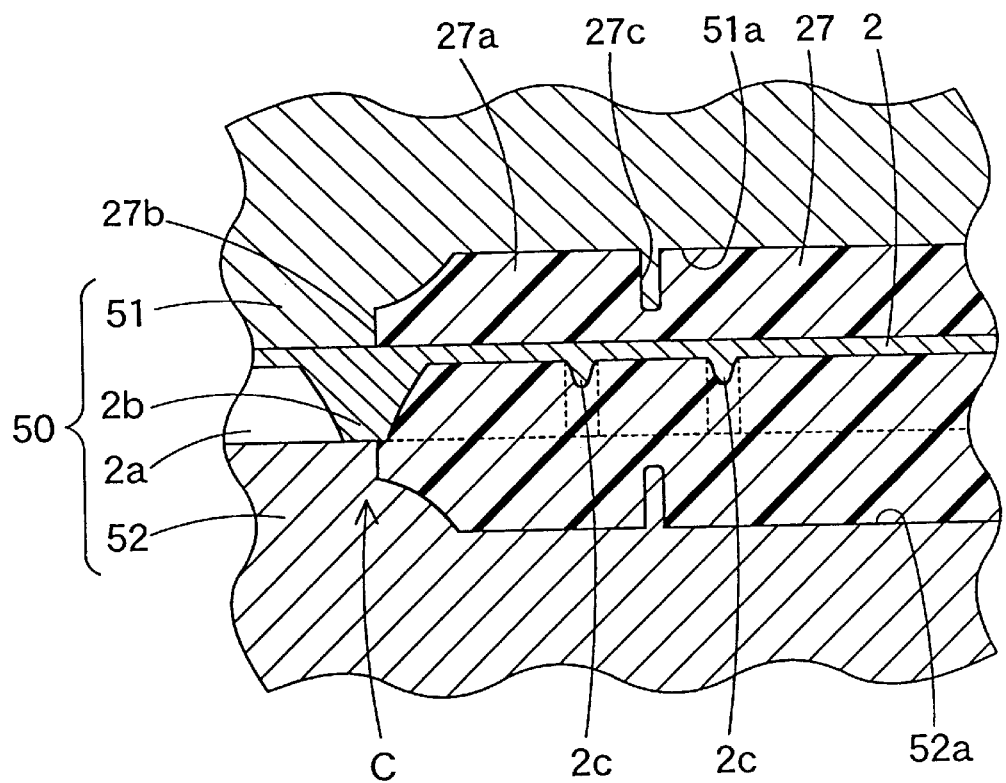
FIG. 19 is a section of a boundary portion of the first and second coated layers when the first coated portion of the same embodiment is molded; this section and is taken along the circumferential direction of the plane of the ring portion core.

Then, the steering wheel core 1 is set in a mold 50 in an open state (as shown in FIGS. 18 and 19). This mold 50 is composed of split dies 51 and 52. Moreover, the mold 50 can mold the first coating layer 27. After the steering wheel core 1 has been set, the mold 50 is clamped and fed with a material for molding the first coating layer 27. Then, the first coating layers 27 and 27 are injection-molded to have the annular grooves 27c.

Next, the mold 50 is opened to part the molding. After this, the burr (22) is removed by polishing it with buffer. For this deburring work, a level difference between the deburred portion and the surrounding general portion is set to 0.5 mm or less. Then, a primer is applied to the surfaces of the first coating layers 27 between the annular grooves 27c. After this, a coating agent is applied to form a transparent protective coating layer. As a result, the decorative layer 12 is formed by hydraulic transfer on the surfaces of the first coating layers 27 between the annular grooves 27c and 27c.

After this, within a mold capable of molding the second coating layer 28 and the spoke portion coating layer 29, there is set the steering wheel core 1, which is provided with the first coating layers 27 and the decorative layer 12. Then, the mold is clamped and fed with a molding material for the second coating layer 28, to form the second coating layers 28 and 28 and the spoke portion coating layer 29. Here, the faces of the mold at this time are held, during clamping, to push the outer circumferences of the individual end portions 27a of the first coating layers 27, with the exception of the decorative layer 12.

After this, the molding is parted from the mold to derive the second coating layers 28 and the spoke portion coating layer 29. Next, an adhesive is applied around the second coating layers 28 and the spoke portion coating layer 29. After this, the skin 18 is stitched and arranged on the surface of the adhesive. At this time, the end portions 18a and 18b of the skin 18 are brought at their vicinities into direct abutment against the outer circumferences of the end portions 27a of the first coating layers 27 and 27. Moreover, the end portions 18a and 18b are folded into the individual annular grooves 27c formed in the first coating layers 27.

When the not-shown lower cover or pad P is attached to the lower portion or upper portion of the boss portion B, the manufacture of the steering wheel W5 is then completed. The steering wheel W5 thus manufactured can be mounted for use on a vehicle. Here, the steering wheel W5 is mounted on the vehicle by means of nuts, with the pad P being removed. After the steering wheel W5 has been mounted on the vehicle, moreover, the pad P is assembled with the steering wheel W5.

In the steering wheel W5 of the fourth embodiment, the ring portion core 2 is provided with the closed portions 2b at the individual end faces 27b of the first coating layers 27. Each closed portion 2b closes the groove 2a on the inner peripheral side of the U-shaped section of the ring portion core 2.

At a boundary portion C between the first coating layer 27 and the second coating layer 28, therefore, mold faces 51a and 52a of the mold 50 may be pushed to contact with only the outer circumference of the ring portion core 2, including the outer peripheries of the closed portions 2b, as shown in FIGS. 18 and 19. That is to say, at the boundary portion C between the first coating layer 27 and the second coating layer 28, the mold faces 51a and 52a need not be pushed to contact with the recessed inner peripheral sides of the U-shaped section of the core 2. In other words, what is required is to bring the mold faces 51a and 52a into contact with the bulging outer peripheral face, generally in a square column of the core 2. As a result, the formation of a burr (which might otherwise extend along the core 2 toward the second coating layer 28) on the molding material of the first coating layer 27 is suppressed.

In the steering wheel W5 of the fourth embodiment, it is possible to mold to a high degree of sizing accuracy the first coating layers 27, such that they are formed around the ring portion core 2. Moreover, it is possible to prevent burring of the molding material of the first coating layer 27, which burr might otherwise extend toward the second coating layer 28. As a result, the steering wheel W5 does not involve troublesome post-treatment, such as deburring work.

In the steering wheel W5 of the fourth embodiment, moreover, the ring portion core 2 is provided with the ridges 2c at the positions where the end portions 27a of the first coating layers 27 are arranged. As a result, the first coating layers 27 are hooked, when molded, by the ridges 2c so that their molding shrinkage can be suppressed.

In the steering wheel W5 of the fourth embodiment, therefore, molding shrinkage of the first coating layers 27 can be suppressed. As a result, the first coating layers 27 to be formed around the ring portion core 2 can retain a high level of sizing accuracy.

Figure 20:
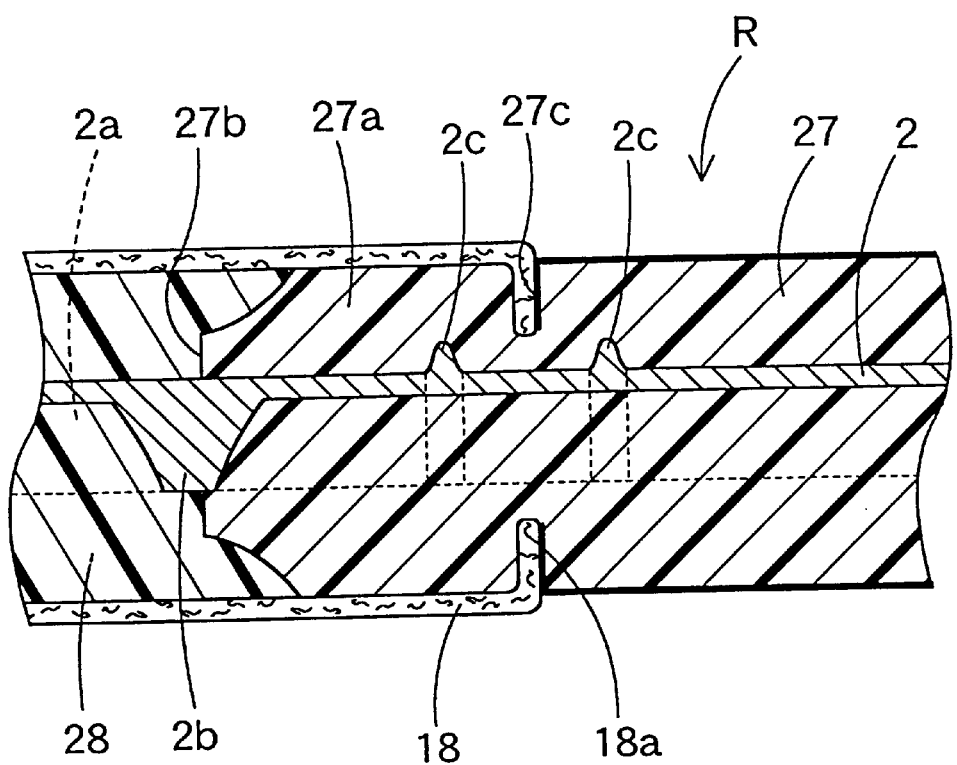
FIG. 20 is an enlarged section showing a portion of a modification of the same embodiment.

Here in the fourth embodiment, the two ridges 2c are formed on the ring portion core 2 on the inner peripheral side of the groove 2a. Despite this formation, however, the ridges 2c are not limited to two ridges; one or three or more ridges may also be provided. Moreover, the ridges 2c do not necessity have to be ridges, but may also be partial rises. In addition, the ridges 2c may be formed on the outer circumferential side of the ring portion core 2, as shown in FIG. 20. When the ridges 2c are formed on the outer circumferential side of the ring portion core 2, the following actions and effects be achieved. When the ridges 2c are formed on the outer circumferential side of the ring portion core 2, more specifically, the first coating layers 27 become more liable to be hooked than the case in which they are formed on the inner peripheral sides of the grooves 2a. As a result, the ridges 2c can be given a lower height level when they are formed on the outer circumferential side of the ring portion core 2.

What is claimed is:

1. A steering wheel comprising a ring portion to be gripped during steering and including:
   a core having at least one ridge; and
   a core coating layer coating said core, said core coating layer having a first portion formed of a first synthetic resin and a second portion formed of a second synthetic resin arranged in the circumferential direction relative to each other, said first portion being harder than said second portion, wherein said ridge is positioned along said core so as to be covered by said first portion and said ridge is arranged to be covered by an end portion of said first portion.

2. The steering wheel of claim 1, wherein said core has a plurality of ridges, said ridges including said at least one ridge.

3. The steering wheel of claim 1, further comprising a decorative layer covering a surface of said first portion.

4. The steering wheel of claim 1, further comprising a skin covering a surface of said second portion.

5. The steering wheel of claim 4, wherein said first portion of said core coating layer has a groove receiving an end portion of said skin.

6. The steering wheel of claim 5, wherein said groove is circumferentially positioned between a plurality of ridges, said ridges including said at least one ridge.

7. A steering wheel comprising a ring portion to be gripped during steering and including:

a ring portion core having a U-shaped section with an inner peripheral side defining a channel and at least one ridge being positioned along said channel;

a core coating layer coating said core, said core coating layer having a first portion made of a first synthetic resin and a second portion made of a second synthetic resin arranged in the circumferential direction relative to each other, the first portion being harder than the second portion, wherein said ridge is positioned along said core so as to be covered by said first portion.

8. The steering wheel of claim 7, wherein said core has a plurality of ridges, said ridges including said at least one ridge.

9. The steering wheel of claim 7, wherein said ridge is arranged to be covered by an end portion of said first portion.

10. The steering wheel of claim 7, further comprising a decorative layer covering a surface of said first portion.

11. The steering wheel of claim 7, further comprising a skin covering a surface of said second portion.

12. The steering wheel of claim 11, wherein said first portion of said core coating layer has a groove receiving an end portion of said skin.

13. The steering wheel of claim 12, wherein said groove is circumferentially positioned between a plurality of ridges, said ridges including said at least one ridge.

14. A steering wheel comprising a ring portion to be gripped during steering and including:

a core having at least one ridge; and a core coating layer coating said core, said core coating layer having a first portion formed of a first synthetic resin and a second portion formed of a second synthetic resin arranged in the circumferential direction relative to each other, said first portion being harder than said second portion, said second portion being covered by a skin on a surface thereon and said first portion having a groove for receiving an end portion of said skin, wherein said ridge is positioned along said core so as to be covered by said first portion.

15. A steering wheel comprising a ring portion to be gripped during steering and including:

a core having a plurality of ridges; and a core coating layer coating said core, said core coating layer having a first portion formed of a first synthetic resin and a second portion formed of a second synthetic resin arranged in the circumferential direction relative to each other, said first portion being harder than said second portion, said second portion being covered by a skin on a surface thereon and said first portion having a groove for receiving an end portion of said skin, wherein said ridge is positioned along said core so as to be covered by said first portion and wherein said groove is interposed between said ridges.

* * * * *